US012750101B2

(12) United States Patent
Großmann et al.

(10) Patent No.: US 12,750,101 B2
(45) Date of Patent: Sep. 29, 2026

(54) CSI REPORTING BASED ON LINEAR COMBINATION PORT-SELECTION CODEBOOK

(71) Applicant: KONINKLIJKE PHILIPS N.V., Eindhoven (NL)

(72) Inventors: Marcus Großmann, Erlangen (DE); Venkatesh Ramireddy, Erlangen (DE); Markus Landmann, Erlangen (DE)

(73) Assignee: Koninklijke Philips N.V., Eindhoven (NL)

( * ) Notice: Subject to any disclaimer, the term of this patent is extended or adjusted under 35 U.S.C. 154(b) by 187 days.

(21) Appl. No.: 17/869,436

(22) Filed: Jul. 20, 2022

(65) Prior Publication Data

US 2022/0385344 A1 Dec. 1, 2022

Related U.S. Application Data

(63) Continuation of application No. PCT/EP2021/051494, filed on Jan. 22, 2021.

(30) Foreign Application Priority Data

Jan. 24, 2020 (EP) .................................... 20153656
Jul. 15, 2020 (EP) .................................... 20186022

(51) Int. Cl.
*H04B 7/0456* (2017.01)
*H04B 7/06* (2006.01)
*H04L 5/00* (2006.01)

(52) U.S. Cl.
CPC ......... *H04B 7/0478* (2013.01); *H04B 7/0626* (2013.01); *H04L 5/0048* (2013.01)

(58) Field of Classification Search
CPC .... H04B 7/0478; H04B 7/0626; H04L 5/0048
See application file for complete search history.

(56) References Cited

U.S. PATENT DOCUMENTS

2016/0149680 A1* 5/2016 Kang .................. H04B 7/0639 370/329
2016/0156397 A1* 6/2016 Onggosanusi ....... H04B 7/0421 370/252

(Continued)

OTHER PUBLICATIONS

3GPP TS 36.211 V14.13.0 (Dec. 2019), 3rd Generation Partnership Project; Technical Specification Group Radio Access Network; Evolved Universal Terrestrial Radio Access (E-UTRA); Physical channels and modulation, (Release 14) (Year: 2019).*

(Continued)

*Primary Examiner* — Jaison Joseph

(57) ABSTRACT

A method for providing feedback about a MIMO channel between a transmitter and a receiver in a wireless communication system includes receiving a radio signal which includes one or more reference signals according to at least one reference signal configuration known at the receiver and indicating one or more antenna ports associated with the reference signals; estimating the MIMO channel based on measurements on the reference signals; determining a precoding vector or matrix based on the estimated MIMO channel, on one or more vectors or one or more combinations of vectors from at least one port-selection codebook and on a set of precoding coefficients, the port-selection codebook including vectors, each vector being associated with one of the antenna ports and having a single element which is one and the remaining elements being zeros; and reporting, a feedback to the transmitter which indicates the determined precoding vector or matrix.

31 Claims, 11 Drawing Sheets

(56) References Cited

U.S. PATENT DOCUMENTS

| | | | | |
|---|---|---|---|---|
| 2017/0244533 | A1* | 8/2017 | Onggosanusi | H04B 7/0478 |
| 2018/0343046 | A1* | 11/2018 | Park | H04W 76/27 |
| 2019/0053089 | A1* | 2/2019 | Kwak | H04W 72/23 |
| 2019/0081678 | A1* | 3/2019 | Park | H04W 72/56 |
| 2019/0109626 | A1* | 4/2019 | Park | H04B 7/0658 |
| 2019/0326974 | A1* | 10/2019 | Li | H04B 7/0634 |
| 2019/0341981 | A1* | 11/2019 | Park | H04B 7/0639 |
| 2020/0112355 | A1* | 4/2020 | Park | H04L 5/0094 |
| 2020/0177252 | A1* | 6/2020 | Park | H04L 27/18 |
| 2021/0203392 | A1* | 7/2021 | Kwak | H04B 7/0478 |
| 2022/0385344 | A1* | 12/2022 | Großmann | H04B 7/0478 |
| 2022/0393736 | A1* | 12/2022 | Park | H04B 7/10 |
| 2023/0040058 | A1* | 2/2023 | Huang | H04B 7/024 |

OTHER PUBLICATIONS

3rd Generation Partnership Project; Technical Specification Group Radio Access Network; Evolved Universal Terrestrial Radio Access (E-UTRA); Physical channels and modulation.*

3GPP TS 38.214 V15.8.0, "3GPP; TSG RAN; NR; Physical layer procedures for data (Rel. 15).", Jan. 2020.

Samsung, "Revised WID: Enhancements on MIMO for NR", RP-182067, 3GPP RAN#81, Gold Coast, Australia, Sep. 10-13, 2018.

R1-1806124, Fraunhofer IIS, Fraunhofer HHI, Enhancements on Type-II CSI reporting scheme, RAN1#93, Busan, South Korea, May 21-May 25, 2018.

R1-1811088, Fraunhofer IIS, Fraunhofer HHI, Enhancements on Type-II CSI reporting scheme, RAN1#94-Bis, Chengdu, China, Oct. 8-Oct. 12, 2018.

3GPP TS 38.214 V16.0.0, "3GPP; TSG RAN; NR; Physical layer procedures for data (Rel. 16).", Dec. 2019.

T. Choi et al., "Channel extrapolation for FDD massive MIMO: Procedure and experimental results," IEEE 90th Vehicular Technology Conference (VTC2019-Fall), 2019.

W. Peng et al., "Downlink channel prediction for time-varying FDD massive MIMO systems," IEEE Journal of Selected Topics in Signal Processing, vol. 13, No. 5, pp. 1090-1102, Sep. 2019.

K. Hugl, "Spatial reciprocity of uplink and downlink radio channels in FDD systems", COST 273 TD(02) 066, May 2002.

Z. Zhong et al., "FDD Massive MIMO Uplink and Downlink Channel Reciprocity Properties: Full or Partial Reciprocity?," https://arxiv.org/pdf/1912.11221.pdf, Dec. 2019.

3GPP TS 38.211 V16.0.0, "3GPP; TSG RAN; NR; Physical channels and modulation (Rel. 16).", Dec. 2019.

CMCC, "Considerations on hybrid non-precoded CSI-RS and beamformed CSI-RS", vol. RAN WG1, No. Nanjing, China; May 23-27, 2016, 3GPP Draft; R1-164880, 3rd Generation Partnership Project (3GPP), Mobile Competence Centre ; 650, Route Des Lucioles ; F-06921 Sophia-Antipolis Cedex ; France, URL: http://www.3gpp.org/ftp/tsg_ran/WG1_RL1/TSGR1_85/Docs/, (May 13, 2016), XP051096844 [Y].

LG Electronics, "Discussion on beamformed CSI-RS-based scheme enhancements", vol. RAN WG1, No. Belgrade, Serbia; Apr. 20-24, 2015, 3GPP Draft; R1-151532, 3rd Generation Partnership Project (3GPP), Mobile Competence Centre ; 650, Route Des Lucioles ; F-06921 Sophia-Antipolis Cedex ; France, URL: http://www.3gpp.org/ftp/Meetings_3GPP_SYNC/RAN1/Docs/, (Apr. 19, 2015), XP050934404 [A].

NTT Docomo, "Type II CSI Enhancement for MU-MIMO Support", vol. RAN WG1, No. Chongqing, China; Oct. 14-18, 2019, 3GPP Draft; R1-1911183, 3rd Generation Partnership Project (3GPP), Mobile Competence Centre ; 650, Route Des Lucioles ; F-06921 Sophia-Antipolis Cedex ; France, URL: http://www.3gpp.org/ftp/tsg_ran/WG1_RL1/TSGR1_98b/Docs/R1-1911183.zip, (Oct. 5, 2019), XP051789955 [A].

ZTE, "Type II CSI feedback based on linear combination", vol. RAN WG1, No. Hangzhou, China; May 15-19, 2017, 3GPP Draft; R1-1707127 Type II CSI Feedback Based on Linear Combination, 3rd Generation Partnership Project (3GPP), Mobile Competence Centre ; 650, Route Des Lucioles ; F-06921 Sophia-Antipolis Cedex, URL: http://www.3gpp.org/ftp/tsg_ran/WG1_RL1/TSGR1_89/Docs/, (May 7, 2017), XP051262915 [A].

Ericsson, "Details on the unified CSI feedback framework for NR", vol. RAN WG1, No. Lisbon, Portugal; Oct. 10-14, 2016, 3GPP Draft; R1-1609761 Details on the Unified CSI Feedback Framework for NR, 3rd Generation Partnership Project (3GPP), Mobile Competence Centre ; 650, Route Des Lucioles ; F-06921 Sophia-Antipolis CE, URL: http://www.3gpp.org/ftp/tsg_ran/WG1_RL1/TSGR1_86b/Docs/, (Sep. 30, 2016), XP051158847 [A].

Fraunhofer Iis et al, "Enhancements on Type-II CSI Reporting Scheme", vol. RAN WG1, No. Sanya, China; Apr. 16-20, 2018, 3GPP Draft; R1-1804118, 3rd Generation Partnership Project (3GPP), Mobile Competence Centre ; 650, Route Des Lucioles ; F-06921 Sophia-Antipolis Cedex ; France, URL: http://www.3gpp.org/ftp/Meetings%5F3GPP%5FSYNC/RAN1/Docs/, (Apr. 15, 2018), XP051426407 [A].

Samsung, "Type II CSI reporting for NR", vol. RAN WG1, No. Spokane, USA; Jan. 16-20, 2017, 3GPP Draft; R1-1700910 Type II CSI Reporting for NR R1, 3rd Generation Partnership Project (3GPP), Mobile Competence Centre ; 650, Route Des Lucioles ; F-06921 Sophia-Antipolis Cedex ; France, URL: http://www.3gpp.org/ftp/tsg_ran/WG1_RL1/TSGR1_AH/NR_AH_1701/Docs/, (Jan. 10, 2017), XP051203208 [A].

* cited by examiner

CSI REPORTING BASED ON LINEAR COMBINATION PORT-SELECTION CODEBOOK

CROSS-REFERENCES TO RELATED APPLICATIONS

This application is a continuation of copending International Application No. PCT/EP2021/051494, filed Jan. 22, 2021, which is incorporated herein by reference in its entirety, and additionally claims priority from European Applications Nos. EP 20 153 656.2, filed Jan. 24, 2020, and EP 20 186 022.8, filed Jul. 15, 2020, all of which are incorporated herein by reference in their entirety.

The present application concerns the field of wireless communications, more specifically to feedback reporting for a codebook-based precoding in a wireless communication system. Embodiments related to CSI reporting based on linear combination port-selection codebook.

FIG. 1 is a schematic representation of a terrestrial wireless network 100 including, as is shown in FIG. 1(*a*), a core network 102 and one or more radio access networks $RAN_1$, $RAN_2$, . . . . $RAN_N$. FIG. 1(*b*) is a schematic representation of a radio access network 104 that may include one or more base stations $gNB_1$ to $gNB_5$, each serving a specific area surrounding the base station schematically represented by respective cells $\mathbf{106}_1$ to $\mathbf{106}_5$.

The base stations are provided to serve users within a cell. The term base station, BS, refers to a gNB in 5G networks, eNB in UMTS/LTE/LTE-A/LTE-A Pro, or just BS in other mobile communication standards. A user may be a stationary device or a mobile device which connects to a base station or to a user. The mobile device may include a physical device, like a user equipment, UE; or a IoT device, a ground based vehicle, such as a robot or a car, an aerial vehicle, such as a manned or unmanned aerial vehicle (UAV), the latter also referred to as drone, a building or any other item or device having embedded network connectivity that enables collecting or exchanging data across an existing network infrastructure, like a device including certain electronics, software, sensors, actuators, or the like. FIG. 1 shows only five cells, however, the wireless communication system may include more such cells. FIG. 1 shows two users $UE_1$ and $UE_2$, also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g., via the S1 interface, via respective backhaul links $\mathbf{114}_1$ to $\mathbf{114}_5$, which are schematically represented in FIG. 1 by the arrows pointing to "core".

The core network 102 may be connected to one or more external networks. Further, some or all of the respective base station $gNB_1$ to $gNB_5$ may connected, e.g. via the S1 or X2 interface or XN interface in NR, with each other via respective backhaul links $\mathbf{116}_1$ to $\mathbf{116}_5$, which are schematically represented in FIG. 1 by the arrows pointing to "$gNB_5$".

For data transmission a physical resource grid may be used. The physical resource grid may comprise a set of resource elements to which various physical channels and physical signals are mapped. For example, the physical channels may include the physical downlink, uplink and/or sidelink, SL, shared channels (PDSCH, PUSCH, PSSCH) carrying user specific data, also referred to as downlink, uplink or sidelink payload data, the physical broadcast channel (PBCH) carrying for example a master information block (MIB) and a system information block (SIB), the physical downlink, uplink and/or sidelink control channels (PDCCH, PUCCH, PSCCH) carrying for example the downlink control information (DCI), the uplink control information (UCI) or the sidelink control information (SCI). For the uplink, the physical channels may further include the physical random access channel (PRACH or RACH) used by UEs for accessing the network once a UE is synchronized and obtains the MIB and SIB. The physical signals may comprise reference signals or symbols (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also include or consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having two distinct overlaid networks, a network of macro cells with each macro cell including a macro base station, like base station $gNB_1$ to $gNB_5$, and a network of small cell base stations (not shown in FIG. 1), like femto- or pico-base stations. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a wireless communication system like the one depicted schematically in FIG. 1, multi-antenna techniques may be used, e.g., in accordance with LTE, NR or any other communication system, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct or focus a data transmission towards an intended receiver. The precoder matrix to be used at the gNB to map the data to the transmit antenna ports is decided using channel state information, CSI.

In a wireless communication system as described above, such as LTE or New Radio (5G), downlink signals convey data signals, control signals containing downlink, DL, control information (DCI), and a number of reference signals or symbols (RS) used for different purposes. A gNodeB (or gNB or base station) transmits data and downlink control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of RSs including a common RS (CRS) in LTE, a channel state information RS (CSI-RS), a demodulation RS (DM-RS), and a phase tracking RS (PT-RS). The CRS is transmitted over a DL system bandwidth part and used at the user equipment (UE) to obtain a channel estimate to demodulate the data or control information. The CSI-RS is transmitted with a reduced density in the time and frequency domain compared to CRS and used at the UE for channel estimation or for channel state information (CSI) acquisition. The DM-RS is transmitted only in a bandwidth part of the respective PDSCH and used by the UE for data demodulation. For signal precoding at the gNB, several CSI-RS reporting mechanisms are used such as non-precoded CSI-RS and beamformed CSI-RS reporting (see reference [1]). For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam direction and beam width. For beamformed/precoded UE-specific or non-UE-specific CSI-RS, a beamforming operation is applied over a single antenna ports or over multiple antenna ports to have several narrow beams with high gain in different directions and, therefore, no cell-wide coverage.

In a wireless communication system employing time division duplexing, TDD, due to channel reciprocity, the channel state information (CSI) is available at the base station (gNB). However, when employing frequency division duplexing, FDD, due to the absence of channel reciprocity, the channel is estimated at the UE and the estimate is fed back to the gNB. FIG. 2 shows a block-based model of a MIMO DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array $ANT_T$ having a plurality of antennas or antenna elements, and a precoder 206 receiving a data vector 208 and a precoder matrix F from a codebook 210. The channel 204 may be described by the channel tensor/matrix 212. The user equipment 202 receives the data vector 214 via an antenna or an antenna array $ANT_R$ having a plurality of antennas or antenna elements. A feedback channel 216 between the user equipment 202 and the base station 200 is provided for transmitting feedback information. The previous releases of 3GPP up to Rel. 15 support the use of several downlink reference symbols (such as CSI-RS) for CSI estimation at the UE.

In FDD systems (up to Rel. 15), the estimated channel at the UE is reported to the gNB implicitly where the CSI report transmitted by the UE over the feedback channel includes the rank index (RI), the precoding matrix index (PMI) and the channel quality index (CQI) (and the CRI from Rel. 13) allowing, at the gNB, to decide the precoding matrix, and the modulation order and coding scheme (MCS) of the symbols to be transmitted. The PMI and the RI are used to determine the precoding matrix from a predefined set of matrices Ω also referred to as codebook. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for $gNB_5$ equipped with one-dimensional Uniform Linear Arrays (ULAs) having $N_1$ dual-polarized antennas (in total $N_t=2N_1$ antennas), or with two-dimensional Uniform Planar Arrays (UPAs) having dual-polarized antennas at $N_1N_2$ positions (in total $N_t=2N_1N_2$ antennas). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beamforming weights (also referred to as the array steering vectors) of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to read the codebook and obtain the precoder. The array steering vectors may be described by the columns of a 2D Discrete Fourier Transform (DFT) matrix when ULAs or UPAs are used for signal transmission.

The precoder matrices used in the Type-I and Type-II CSI reporting schemes in 3GPP New Radio Rel. 15 are defined in the frequency-domain and have a dual-stage structure (i.e., two components codebook): $F(s)=F_1F_2(s)$, s=0 . . . , S−1 (see reference [1]), where S denotes the number of subbands. The first component or the so-called first stage precoder, $F_1$, is used to select a number of beam vectors and (if configured) rotation oversampling factors from a Discrete Fourier Transform-based (DFT-based) matrix, which is also called the spatial codebook. Moreover, the first stage precoder, $F_1$, corresponds to a wide-band matrix, independent of the subband index s, and contains L spatial beamforming vectors (the so-called spatial beams) $b_l \in \mathbb{C}^{N_1N_2\times 1}$, l=0, . . . , L−1 selected from a DFT-based codebook matrix for the two polarizations of the antenna array, $$F_1 = \begin{bmatrix} b_0, \ldots, b_{L-1} & 0 \ldots 0 \\ 0 \ldots 0 & b_0, \ldots, b_{L-1} \end{bmatrix} \in \mathbb{C}^{2N_1N_2\times 2L}.$$

The first component or the so-called first stage precoder, $F_1$, is used to select a number of spatial domain (SD) or beam vectors and the rotation oversampling factors from a Discrete Fourier Transform-based (DFT-based) matrix which is also called the spatial codebook. The spatial codebook comprises an oversampled DFT matrix of dimension $N_1N_2 \times N_1O_1N_2O_2$, where $O_1$ and $O_2$ denote the oversampling factors with respect to the first and second dimension of the codebook, respectively. The DFT vectors in the codebook are grouped into $(q_1, q_2)$, $0 \le q_1 \le O_1-1$, $0 \le q_2 \le O_2-1$ subgroups, where each subgroup contains $N_1N_2$ DFT vectors, and the parameters $q_1$ and $q_2$ are denoted as the rotation oversampling factors, with respect to the first and second dimension of the antenna array, respectively.

The second component or the so-called second stage precoder, $F_2(s)$, is used to combine the selected beam vectors. This means the second stage precoder, $F_2(s)$, corresponds to a selection/combining/co-phasing matrix to select/combine/co-phase the beams defined in $F_1$ for the s-th configured sub-band. For example, for a rank-1 transmission and Type-I CSI reporting, $F_2(s)$ is given for a dual-polarized antenna array by (see reference [1])

$$F_2(s) = \begin{bmatrix} e_u \\ e^{j\delta_1} e_u \end{bmatrix} \in \mathbb{C}^{2L \times 1},$$

where $e_u \in C^{Lx1}$ contains zeros at all positions, except the u-th position which is one. Such a definition of $e_u$ selects the u-th vector in $F_1$ per polarization of the antenna. Furthermore, $e^{j\delta_1}$ is a quantized phase adjustment for the second polarization of the antenna array. For example, for a rank-1 transmission and Type-II CSI reporting, $F_2(s)$ is given for dual-polarized antenna arrays by (see reference [1])

$$F_2(s) = \begin{bmatrix} e^{j\delta_0} p_0 \\ \vdots \\ e^{j\delta_{2L-1}} p_{2L-1} \end{bmatrix} \in \mathbb{C}^{2L \times 1}$$

where $p_l$ and $e^{j\delta_l}$, l=0, 2, . . . , 2L−1 are quantized amplitude and phase beam-combining coefficients, respectively. For rank-R transmission, $F_2(s)$ contains R vectors, where the entries of each vector are chosen to combine single or multiple beams within each polarization.

The selection of the matrices $F_1$ and $F_2(s)$ is performed by the UE based on the knowledge of the channel conditions. The selected matrices are indicated in the CSI report in the form of a RI and a PMI, which are used at the gNB to update the multi-user precoder for the next transmission time interval.

For the 3GPP Rel.-15 dual-stage Type-II CSI reporting, the second stage precoder, $F_2(s)$, is calculated on a subband basis such that the number of columns of $$F_2 = \left[F_2^{(r)}(0) \ \dots \ F_2^{(r)}(s) \ \dots \ F_2^{(r)}(S-1)\right]$$

for the r-th transmission layer depends on the number of configured subbands S. Here, a subband refers to a group of adjacent physical resource blocks (PRBs). A drawback of the Type-II CSI feedback is the large feedback overhead for reporting the combining coefficients on a subband basis. The feedback overhead increases approximately linearly with the number of subbands and becomes considerably large for large numbers of subbands. To overcome the high feedback overhead of the Rel.-15 Type-II CSI reporting scheme, it has been decided in 3GPP RAN #81 (see reference [2]-3GPP radio access network (RAN) 3GPP RAN #81) to study feedback compression schemes for the second stage precoder $F_2$. In several contributions (see references [3] and [4]), it has been demonstrated that the number of beam-combining coefficients in $F_2$ may be drastically reduced when transforming $F_2$ using a small set of DFT-based basis vectors into the delay domain. The corresponding three-stage precoder relies on a three-stage (i.e., three components)

$$F_1 F_2^{(r)} F_3^{(r)}$$

codebook. The first component, represented by the matrix $F_1$, is identical to the Rel.-15 NR component, is independent off the transmission layer (r), and contains a number of spatial domain (SD) basis vectors selected from a spatial codebook. The second component, represented by the matrix $$F_3^{(r)},$$

is layer-dependent and is used to select a number of delay domain (DD) basis vectors from a Discrete Fourier Transform-based (DFT-based) matrix which is also called the delay codebook. The third component, represented by the matrix $$F_2^{(r)},$$

contains a number of combining coefficients that are used to combine the selected SD basis vectors and DD basis vectors from the spatial and delay codebooks, respectively.

Assuming a rank-R transmission the three-component precoder matrix or CSI matrix for a configured $2N_1N_2$ antenna/DL-RS ports and configured S subbands is represented for the first polarization of the antenna ports and r-th transmission layer as $$F^{(r,1)} = a^{(r)} \sum_{l=0}^{L-1} b_l \sum_{d=0}^{D-1} \gamma_{1,l,d}^{(r)} d_d^{(r)}$$

and for the second polarization of the antenna ports and r-th transmission layer as $$F^{(r,2)} = a^{(r)} \sum_{l=0}^{L-1} b_l \sum_{d=0}^{D-1} \gamma_{2,l,d}^{(r)} d_d^{(r)},$$

where $b_u$ (l=0, . . . , L−1) represents the u-th SD basis vector selected from the spatial codebook, $$d_d^{(r)} (d = 0, \dots, D-1)$$

is the d-th DD basis vector associated with the r-th layer selected from the delay codebook, $$\gamma_{p,l,d}^{(r)}$$

is the complex delay-domain combining coefficient associated with the u-th SD basis vector, the d-th DD basis vector and the p-th polarization, D represents the number of configured DD basis vectors, and $\alpha^{(r)}$ is a normalizing scalar.

An advantage of the three-component CSI reporting scheme in the above equations is that the feedback overhead for reporting the combining coefficient of the precoder matrix or CSI matrix is no longer dependent on the number of configured frequency domain subbands (i.e., it is independent from the system bandwidth). Therefore, the above three-component codebook has been recently adopted for the 3GPP Rel.-16 dual-stage Type-II CSI reporting specification (see reference [5]).

It is noted that the information in the above section is only for enhancing the understanding of the background of the invention and therefore it may contain information that does not form prior art and is already known to a person of ordinary skill in the art.

Embodiments of the present invention are now described in further detail with reference to the accompanying drawings, in which.

In the following, preferred embodiments of the present invention are described in further detail with reference to the enclosed drawings in which elements having the same or similar function are referenced by the same reference signs.

The current 3GPP Type-I and Type-II CSI reporting schemes are mainly used in frequency division duplex (FDD) system configurations and do not exploit properties of uplink/downlink channel reciprocity. Contrary to FDD system configurations, channel reciprocity is mainly applicable in time division duplex (TDD) systems in which the same carrier is used for uplink and downlink transmissions. Channel measurements performed in the uplink at the base station (gNB) may be used to support downlink transmissions, for example downlink beamforming, without additional feedback or with reduced feedback from the UE.

In FDD systems, channel reciprocity is usually not satisfied since the duplex distance between the uplink and the downlink carriers may be larger than the channel coherence bandwidth. A known approach to obtain CSI even in FDD systems at the base station without UE assistance is based on channel extrapolation (see references [6] and [7]). There, it is assumed that the downlink channel and/or its multipath parameters may be calculated by an extrapolation of the channel response (or its multipath parameters) measured in the uplink. However, measurement results show that such an extrapolation, especially with respect to the phase of the multipath components of the channel, may be inaccurate and lead to inaccurate results (see reference [8]). Recently, it was found that for a variety of scenarios the spatial and delay properties of the uplink and downlink channel responses in FDD systems are strongly correlated, hence, the channel may be considered as partial reciprocal with respect to the angle(s) and delay(s) of the multipath components (see reference [9]).

In current Release 16 Type-II CSI reporting (see reference [5]) the UE needs to calculate a set of beams, a set of delays, and a set of precoder coefficients for the selected beams and delays of the precoder matrix. This, however, results in an increased complexity of the precoder calculation and a feedback overhead of the CSI report. Further, the calculation and reporting of the beams and delays is based on codebooks with a limited resolution, i.e., the information of angles and delays of multipath components of the channel is available at the gNB only with a reduced resolution due to its quantization with a codebook. This reduces the performance of a corresponding precoded downlink transmission employing the precoder coefficients reported by the UE. The present invention addresses these drawbacks.

Figure 1A:
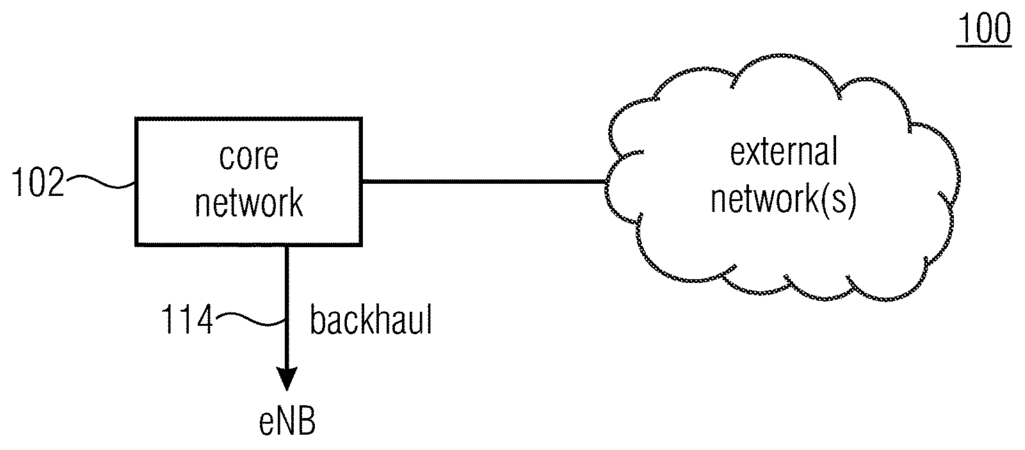
FIG. 1 shows a schematic representation of a wireless communication system.
Figure 1B:
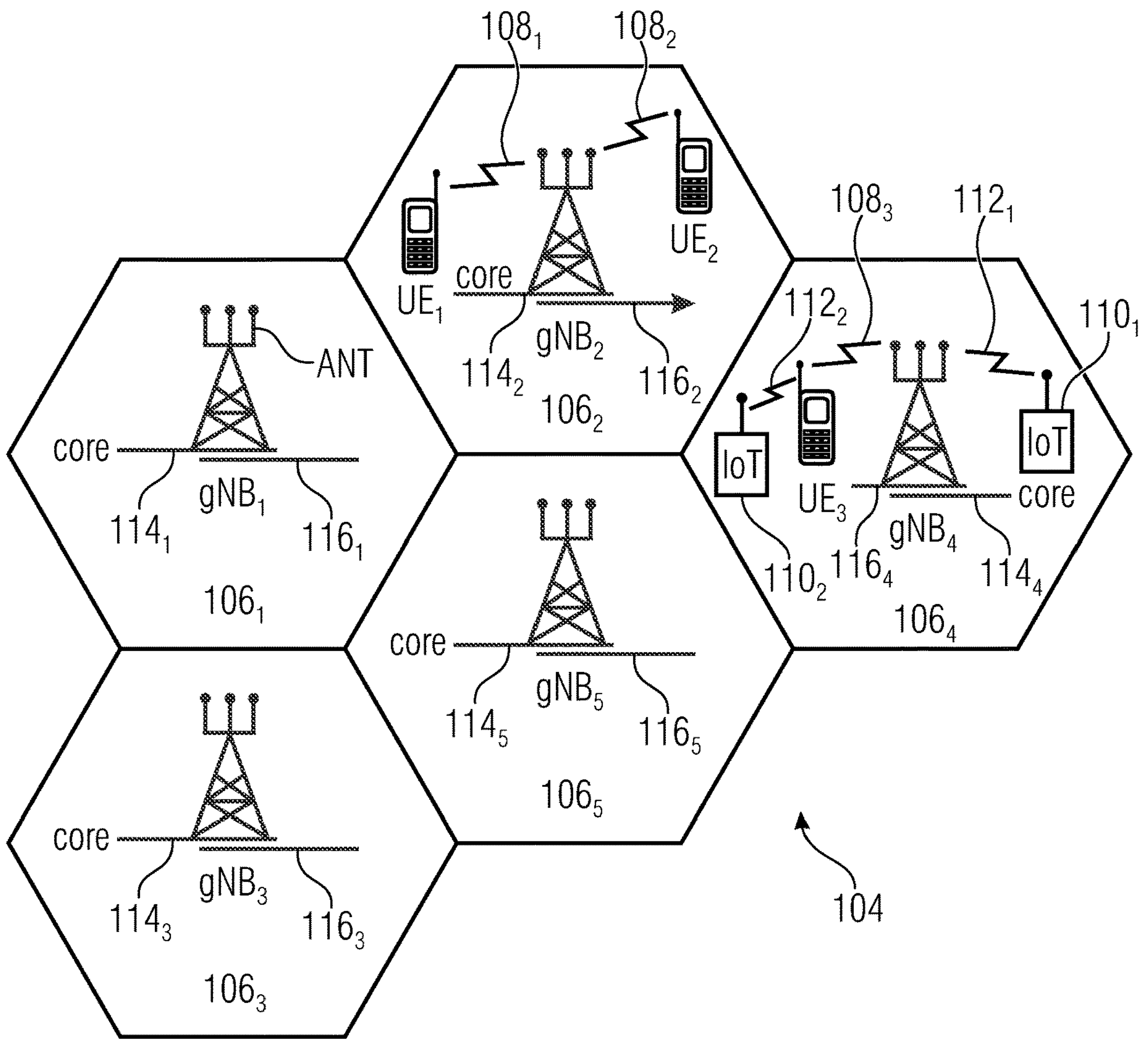
Figure 2:
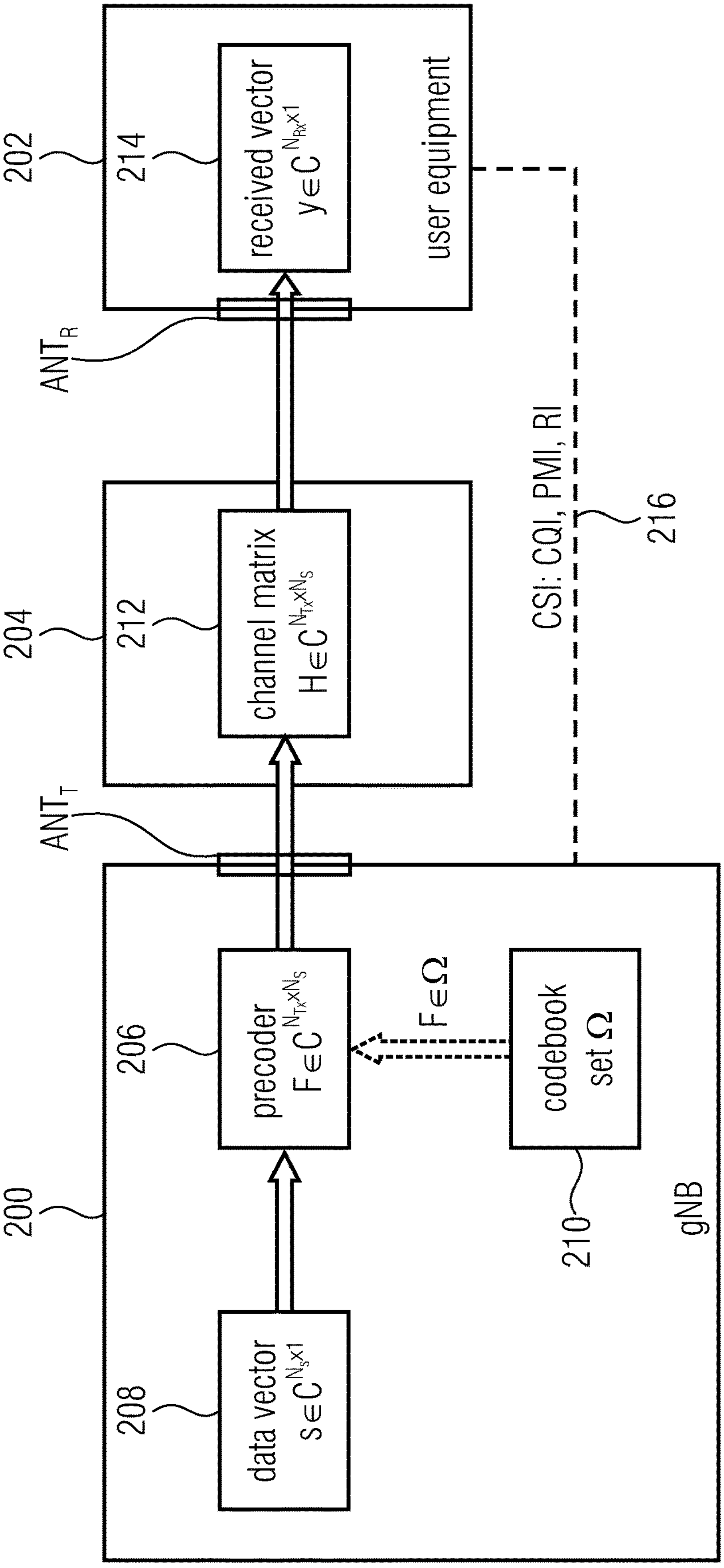
FIG. 2 shows a block-based model of a MIMO DL transmission using codebook-based-precoding in accordance with LTE release 8.
Figure 3:
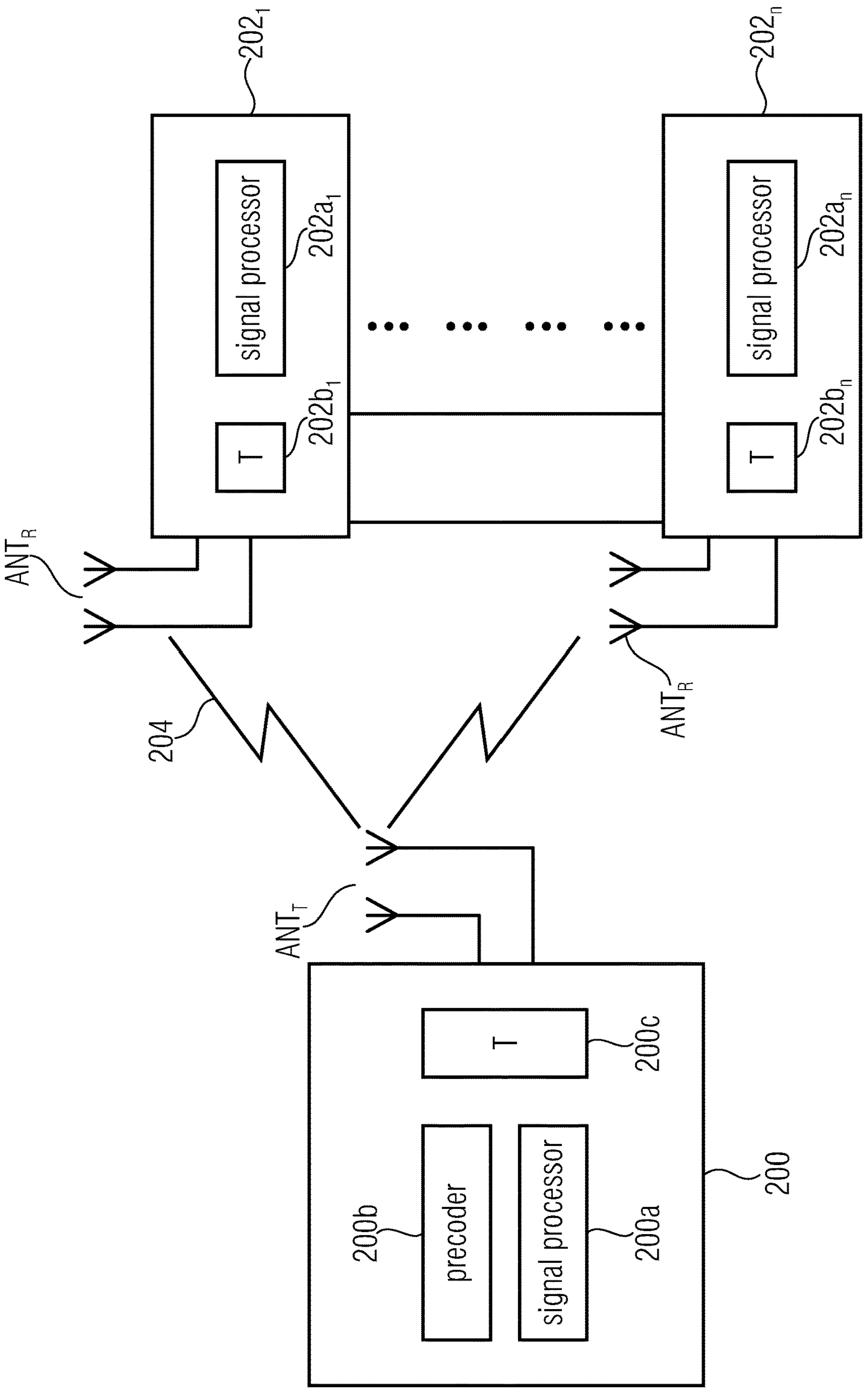
FIG. 3 is a schematic representation of a wireless communication system for communicating information between a transmitter, which may operate in accordance with the inventive teachings described herein, and a plurality of receivers, which may operate in accordance with the inventive teachings described herein.

In accordance with embodiments of the present invention angular and delay information obtained at the gNB by uplink channel sounding measurements is used to precode/beamform a set of CSI-RS resources. The precoded/beamformed CSI-RS resources are used for downlink channel measurements and CSI calculations at the UE. Based on the downlink measurements of the precoded/beamformed CSI-RS, the UE calculates and reports a set of complex precoder coefficients for the configured antenna ports, wherein each antenna port is assumed to be associated with a beam and a delay. As the UE only determines a set of precoder coefficients for the configured ports and does not require to calculate beams and delays for the precoder matrix as in Type-II CSI reporting, the complexity of the precoder calculation and the feedback overhead of the CSI report will be reduced drastically. Moreover, as the information of the angles and delays of the multipath components of the channel is available at the gNB with a high resolution and not quantized with a codebook and reported by the UE, the performance of the corresponding precoded downlink transmission employing the precoder coefficients reported by the UE is significantly higher than the performance achieved by Type-II CSI reporting. Embodiments of the present invention may be implemented in a wireless communication system or network as depicted in FIG. 1 or FIG. 2 including transmitters or transceivers, like base stations, and communication devices (receivers) or users, like mobile or stationary terminals or IoT devices, as mentioned above. FIG. 3 is a schematic representation of a wireless communication system for communicating information between a transmitter 200, like a base station, and a plurality of communication devices 2021 to 202*n*, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, and a signal processor 200*a*. The UEs 202 include one or more antennas $ANT_R$ or an antenna array having a plurality of antennas, a signal processor $202a_1$, $202a_n$, and a transceiver $202b_1$, $202b_n$. The base station 200 and the respective UEs 202 may operate in accordance with the inventive teachings described herein.

Method

The present invention provides a method for providing feedback about a MIMO channel between a transmitter and a receiver in a wireless communication system, the method comprising:

- receiving, at the receiver, a radio signal via the MIMO channel, the radio signal including reference signals, like a CSI-RS signal, according to at least one reference signal configuration, the reference signal configuration being known at the receiver and indicating an antenna port or a plurality of antenna ports that is/are associated with a reference signal or a plurality of reference signals;
- estimating, at the receiver, the MIMO channel based on measurements on the one or more reference signals received over the plurality of antenna ports indicated in the reference signal configuration;
- determining, at the receiver, a precoding vector or matrix to be used at the transmitter so as to achieve a predefined property for a communication over the MIMO channel, the precoding vector or matrix being determined based on the estimated MIMO channel, on one or more vectors or one or more combinations of vectors selected from at least one port-selection codebook and on a set of precoding coefficients, wherein the port-selection codebook comprises a set of vectors, each vector being associated with one of the antenna ports and having a single element which is one and the remaining elements being zeros; and
- reporting, by the receiver, a feedback to the transmitter, the feedback indicating the precoding vector or matrix determined by the receiver.

In accordance with embodiments of the present invention, the plurality, P, of antenna ports in the reference signal configuration are grouped into a number, Z, of port groups, with Z≤P, so that each port group is associated with a subset of the P antenna ports.

In accordance with embodiments of the present invention, the UE is configured to select a number, L, of port groups out of the Z port groups and one or more ports in at least one port group for the calculation of the precoding vector or matrix.

In accordance with embodiments of the present invention, the number, L, of port groups is fixed and is identical to the Z port groups, the receiver, thereby, not selecting port groups.

In accordance with embodiments of the present invention, each vector is associated with one antenna port of a port group, and the port-selection codebook further comprises a set of further vectors, each further vector being associated with one of the port groups and having a single element which is one and the remaining elements being zeros.

In accordance with embodiments of the present invention, the port-selection codebook comprises

- a first code book including a set of first vectors, each first vector being associated with one of the port groups and having a single element which is one and the remaining elements being zeros, and
- a second code book including a set of second vectors, each second vector being associated with one antenna port of a port group and having a single element which is one and the remaining elements being zeros.

In accordance with embodiments of the present invention, the receiver is configured via a higher layer configuration, e.g., RRC, with the grouping of the plurality of antenna ports via a higher layer configuration, the higher layer configuration indicating the number, P, of antenna ports and the number, Z, of port groups, and the number of antenna ports per group is either indicated directly by the higher layer configuration, or determined by the receiver based on parameters contained in the higher layer configuration.

In accordance with embodiments of the present invention, the receiver priori knows, e.g., the grouping is defined in a specification, the grouping of the plurality of antenna ports, and a higher layer configuration indicates, e.g., via RRC, the number P of antenna ports.

In accordance with embodiments of the present invention, the receiver, for the communication over the MIMO channel, is to use one or more subbands of a transmission bandwidth, e.g., the receiver is configured with a number of subbands to be used, and wherein the precoding vector or matrix is identical for the subbands used by the receiver for the communication.

In accordance with embodiments of the present invention, the feedback indicates the precoding coefficients determined by the receiver, and wherein the receiver is configured to decompose each precoder coefficient in one or more amplitude coefficients and a phase coefficient.

In accordance with embodiments of the present invention, the feedback indicates non-zero precoding coefficients determined by the receiver.

In accordance with embodiments of the present invention, the feedback includes one or more of:

- a Channel State Information, CSI, feedback,
- Precoder matrix Indicator, PMI,
- PMI/Rank Indicator, PMI/RI.

In accordance with embodiments of the present invention, the receiver is configured with or a priori knows one or more feedback configurations, e.g., CSI report configurations, associated with the one or more reference signal configurations, and a precoding vector or matrix is determined for each feedback configuration.

In accordance with embodiments of the present invention, each of the plurality of antenna ports in the reference signal configuration is precoded or beamformed and is associated with a spatial beam and a delay.

In accordance with embodiments of the present invention the method further comprises performing, by the transmitter, uplink channel sounding measurements to obtain angular or spatial information and delay information, and utilizing the obtained angular or spatial information and delay information for precoding or beamforming a set of reference signal resources to be used for the channel measurements and feedback calculations at the receiver.

Computer Program Product

The present invention provides a computer program product comprising instructions which, when the program is executed by a computer, causes the computer to carry out one or more methods in accordance with the present invention.

Receiver

The present invention provides a receiver apparatus in a wireless communication system, the receiver is configured to provide feedback about a MIMO channel between a transmitter and the receiver in the wireless communication system, comprising:

a receiver unit to receive a radio signal via the MIMO channel, the radio signal including reference signals, like a CSI-RS signal, according to at least one reference signal configuration, the reference signal configuration being known at the receiver and indicating an antenna port or a plurality of antenna ports that is associated with the reference signals;

a processor to estimate the MIMO channel based on measurements on the reference signals received over the plurality of antenna ports indicated in the reference signal configuration, and determine a precoding vector or matrix to be used at the transmitter so as to achieve a predefined property for a communication over the MIMO channel, the precoding vector or matrix being determined based on the estimated MIMO channel using at least one port-selection codebook and a set of precoding coefficients, wherein the port-selection codebook comprises a set of vectors, each vector being associated with one of the antenna ports and having a single element which is one and the remaining elements being zeros; and wherein the receiver is to report a feedback to the transmitter, the feedback indicating the precoding vector or matrix determined by the receiver.

Transmitter

The present invention provides a transmitter apparatus in a wireless communication system, the transmitter to receive feedback about a MIMO channel between the transmitter and a receiver in the wireless communication system, comprising:

a receiver unit to receive a radio signal via the MIMO channel, the radio signal including reference signals, like uplink channel sounding signals; and a processor to perform uplink channel sounding measurements to obtain angular or spatial information and delay information, and utilize the obtained angular or spatial information and delay information for precoding or beamforming a set of reference signal resources to be used for the channel measurements and feedback calculations at the receiver; and wherein the transmitter is to transmit to the receiver a radio signal via the MIMO channel, the radio signal including the precoded or beamformed reference signals, and receive a feedback from the receiver, the feedback indicating a precoding vector or matrix to be used at the transmitter so as to achieve a predefined property for a communication over the MIMO channel.

System

The present invention provides a wireless communication system operated in accordance with the inventive method. Further, the present invention provides a wireless communication system including one or more of the inventive receivers and/or one or more of the inventive transmitters.

In accordance with embodiments, the transmitter and/or the receiver mentioned above may include one or more of the following: a UE, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or a macro cell base station, or a small cell base station, or a central unit of a base station, or a distributed unit of a base station, or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

In accordance with embodiments, the antenna port is a CSI-RS port, the CSI-RS port comprising a plurality of sub-ports, and a sub-port of the CSI-RS port comprising a subset of the frequency and time domain resources of the CSI-RS port.

Embodiments of the present invention are now described in more details.

Non-Segmented CSI-RS Port Resources

Figure 4:
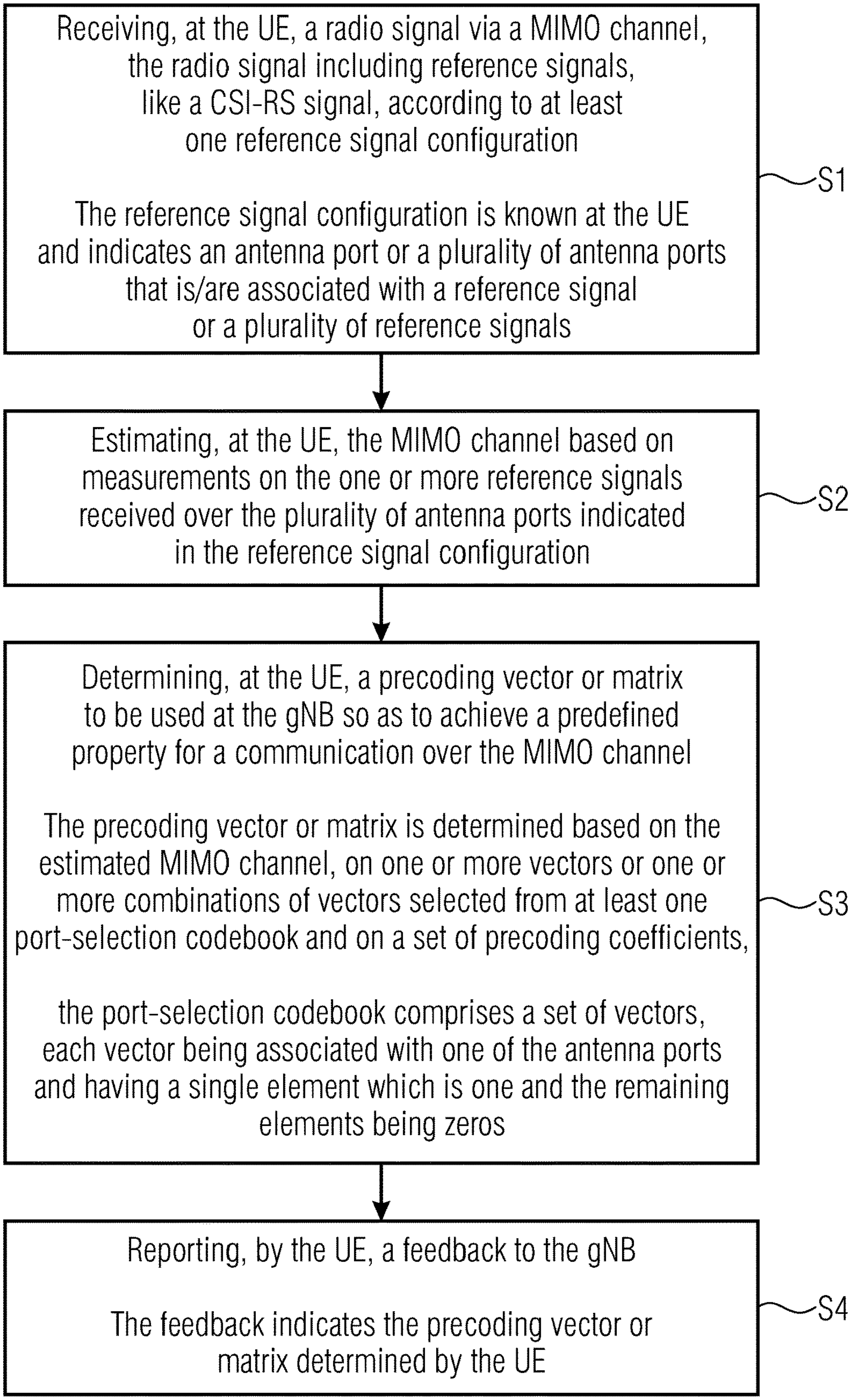
FIG. 4 is a flow diagram representing a method for providing feedback about a MIMO channel between a transmitter, like a gNB, and a receiver, like a UE, in a wireless communication system according to an embodiment of the present invention.

FIG. 4 is a flow diagram representing a method for providing feedback about a MIMO channel between a transmitter, like a gNB, and a receiver, like a UE, in a wireless communication system according to an embodiment of the present invention. In a step S1, the receiver receives a radio signal via the MIMO channel. The radio signal includes reference signals, like a CSI-RS signal, according to at least one reference signal configuration. The reference signal configuration is known at the receiver and indicates an antenna port or a plurality of antenna ports that is/are associated with a reference signal or a plurality of reference signals. In a step S2, the receiver estimates the MIMO channel based on measurements on the one or more reference signals received over the plurality of antenna ports indicated in the reference signal configuration. In a step S3, the receiver determines a precoding vector or matrix to be used at the transmitter so as to achieve a predefined property for a communication over the MIMO channel. The precoding vector or matrix is determined based on the estimated MIMO channel, on one or more vectors or one or more combinations of vectors selected from at least one port-selection codebook and on a set of precoding coefficients. The port-selection codebook includes a set of vectors, and each vector is associated with one of the antenna ports and has a single element which is one and the remaining elements being zeros. In a step S4, the receiver reports a feedback to the transmitter. The feedback indicates the precoding vector or matrix determined by the receiver.

Figure 5:
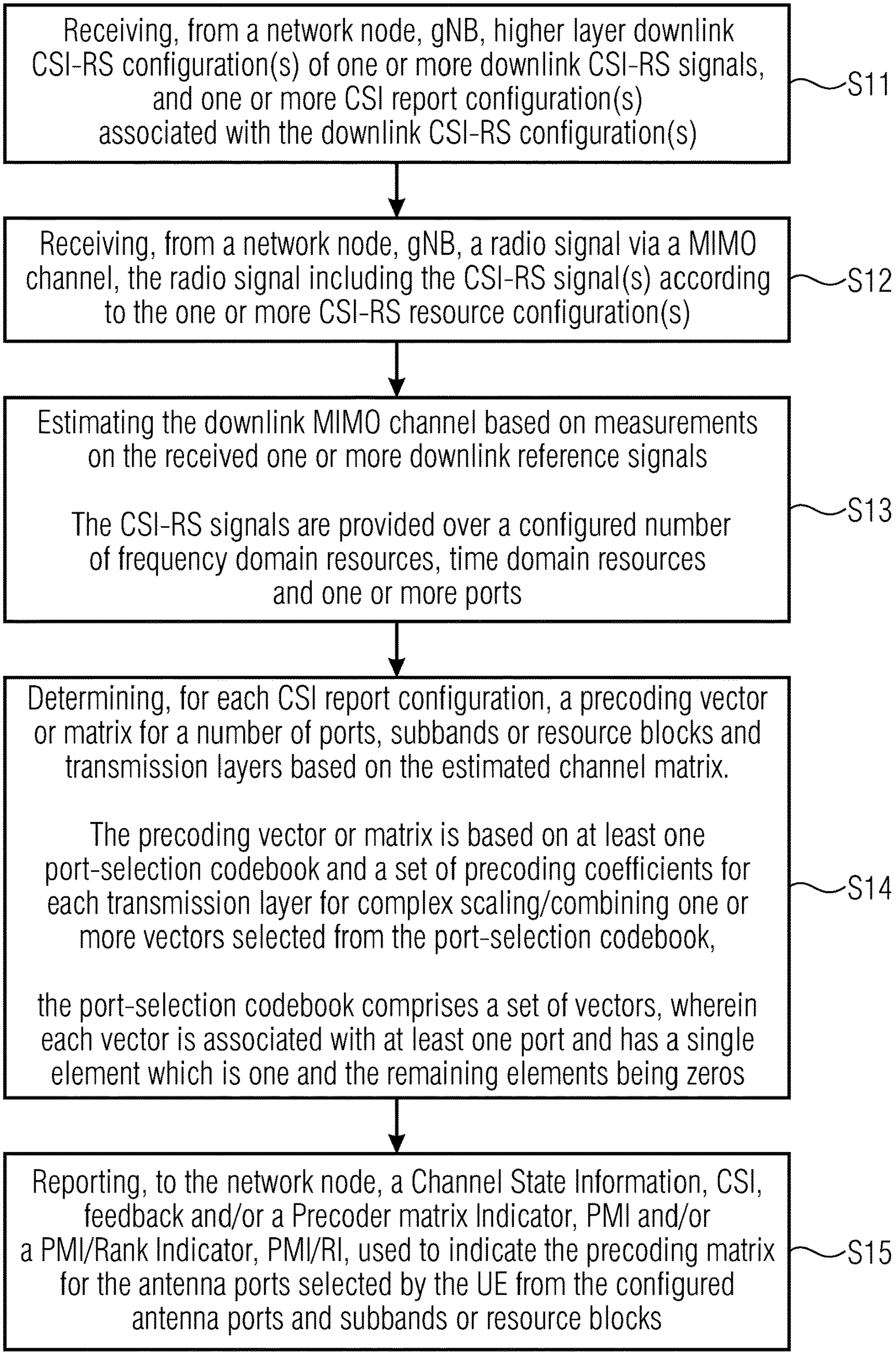
FIG. 5 is a flow diagram representing a method performed by a user equipment, UE, for providing channel state information, CSI, feedback in the form of one or more CSI reports in a wireless communication system according to another embodiment of the present invention.

FIG. 5 is a flow diagram representing a method performed by a user equipment, UE, for providing channel state information, CSI, feedback in the form of one or more CSI reports in a wireless communication system according to another embodiment of the present invention.

In a step S11, the UE receives from a network node, like a gNB, higher layer CSI-RS configuration(s) of one or more downlink CSI-RS signals, and one or more CSI report configuration(s) associated with the downlink CSI-RS configuration(s). In a step S12, the UE receives from a network node a radio signal via a MIMO channel. The radio signal includes the CSI-RS signal(s) according to the one or more CSI-RS resource configuration(s). In a step S13, the UE estimates the downlink MIMO channel based on measurements on the received one or more downlink reference signals. The CSI-RS signals are provided over a configured number of frequency domain resources, time domain resources and one or more ports. In a step S14, the UE determines for each CSI report configuration a precoding vector or matrix for a number of ports, subbands or resource blocks and transmission layers based on the estimated channel matrix. The precoding vector or matrix is based on at least one port-selection codebook and a set of precoding coefficients for each transmission layer for complex scaling/combining one or more vectors selected from the port-selection codebook. The port-selection codebook includes a set of vectors, and each vector is associated with at least one port and has a single element which is one and the remaining elements are zeros. In a step S15, the UE reports to the network node a Channel State Information, CSI, feedback and/or a Precoder matrix Indicator, PMI and/or a PMI/Rank Indicator, PMI/RI, used to indicate the precoding matrix for the antenna ports selected by the UE from the configured antenna ports and subbands and/or resource blocks.

The antenna ports do not correspond to physical antennas at the transmitter, but are logical entities distinguished by their reference signal sequences (with respect to their frequency-time resource grid). An antenna port may map to one or more physical antenna elements of the transmitter antenna array. Each antenna or CSI-RS port may be precoded/beamformed by the transmitter and is associated with a spatial beam and a delay.

It is noted that the steps of the method described above with reference to FIG. 4 and to FIG. 5 also represent a description of a corresponding block or feature of a corresponding apparatus, e.g., the corresponding base station, like base station 200 described with reference to FIG. 2 or FIG. 3, or the corresponding UE, like UE 202 described with reference to FIG. 2 or FIG. 3.

Grouping of CSI-RS Ports

In accordance with embodiments, for the precoder matrix selection at the UE, the network node may indicate groups of ports that are associated with the same beam and different delays to the UE. Using this information, the UE selects a set of port groups and calculates a set of precoder coefficients for the selected ports per group.

Figure 6:
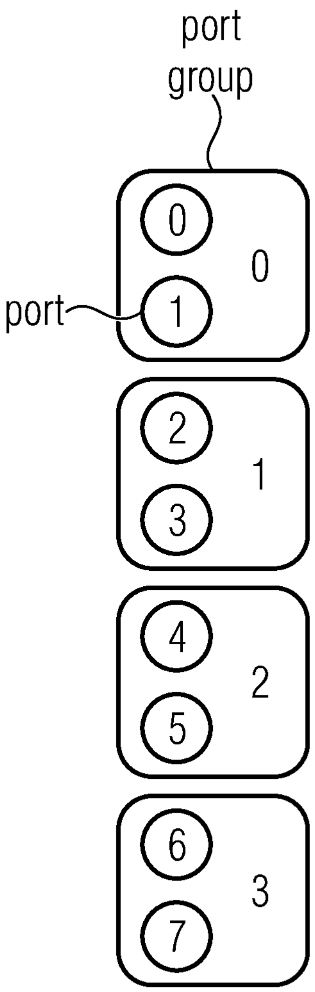
FIG. 6 illustrates a port grouping in accordance with an embodiment of the present invention assuming no polarization and one transmission layer.

In accordance with embodiments, P CSI-RS ports are grouped into Z ($Z \leq P$) port groups, wherein each port group is associated with a subset of the P CSI-RS ports. The number of CSI-RS ports in the Z port groups may be either identical, partially identical or different. For example, the number of CSI-RS ports, P, is 32 and the number of port groups, Z, is 8 and the number of CSI-RS ports per port group is 4. In another embodiment, P=16 and Z=8 and the number of CSI-RS ports per port group is 2. In another embodiment, P=16 and Z=4, and the first port group is associated with 4 CSI-RS ports, the second port group is associated with 4 CSI-RS ports, the third port group is associated with 6 CSI-RS ports, and the fourth port group is associated with 2 CSI-RS ports. In another embodiment, P=Z such that the number of port groups is identical to the number of CSI-RS ports and the number of CSI-RS ports per port group is 1. FIG. 6 illustrates the port grouping in accordance with an embodiment of the present invention assuming P=8 CSI-RS ports 0 to 7 and Z=4, port groups 0, 1, 2 and 3.

Figure 7:
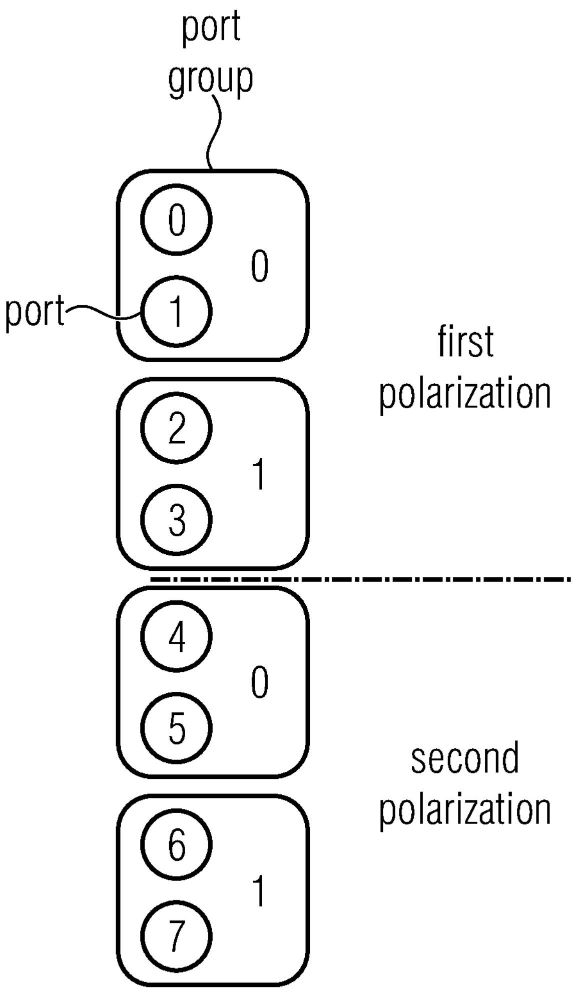
FIG. 7 illustrates the port grouping in accordance with an embodiment of the present invention for two polarizations and one transmission layer.

In accordance with embodiments, the port grouping may also be dependent on the two polarizations of the CSI-RS ports. In case of a polarization-dependent port grouping, a first number of port groups, $Z_1$, is associated with the first P' CSI-RS ports of a first polarization and a second number of port groups, $Z_2$, is associated with the remaining P" CSI-RS ports of a second polarization. In one embodiment, the number of ports per polarization is identical such that P'=P"=P/2. In another embodiment, the number of ports per polarization is not identical and the number of ports associated with the first polarization is larger than the number of ports associated with the second polarization, P'>P" (P'+P"=P). In an embodiment, the number of ports per polarization is not identical and the number of ports associated with the first polarization is smaller than the number of ports associated with the second polarization, P'<P" (P'+P"=P). In one embodiment, the number of ports per polarization is either identical or not and the number of port groups for both polarizations is identical, such that $Z_1=Z_2$. For example, the number of CSI-RS ports, P, is 32 and $Z_1=Z_2=8$ groups are configured per polarization and the number of ports per port group is 2. In yet another embodiment, the number of CSI-RS ports, P, is 32 and $Z_1=Z_2=4$ groups are configured per polarization and the number of ports per port group is 4. In another embodiment, $$Z_1 = Z_2 = \frac{P}{2},$$

so that the number of port groups is identical with the number of CSI-RS ports per polarization and the number of CSI-RS ports per port group and per polarization is 1. FIG. 7 illustrates the port grouping in accordance with an embodiment of the present invention for two polarizations assuming P=8 CSI-RS ports 0 to 7 and Z=2, port groups 0 and 1 per polarization.

Figure 8:
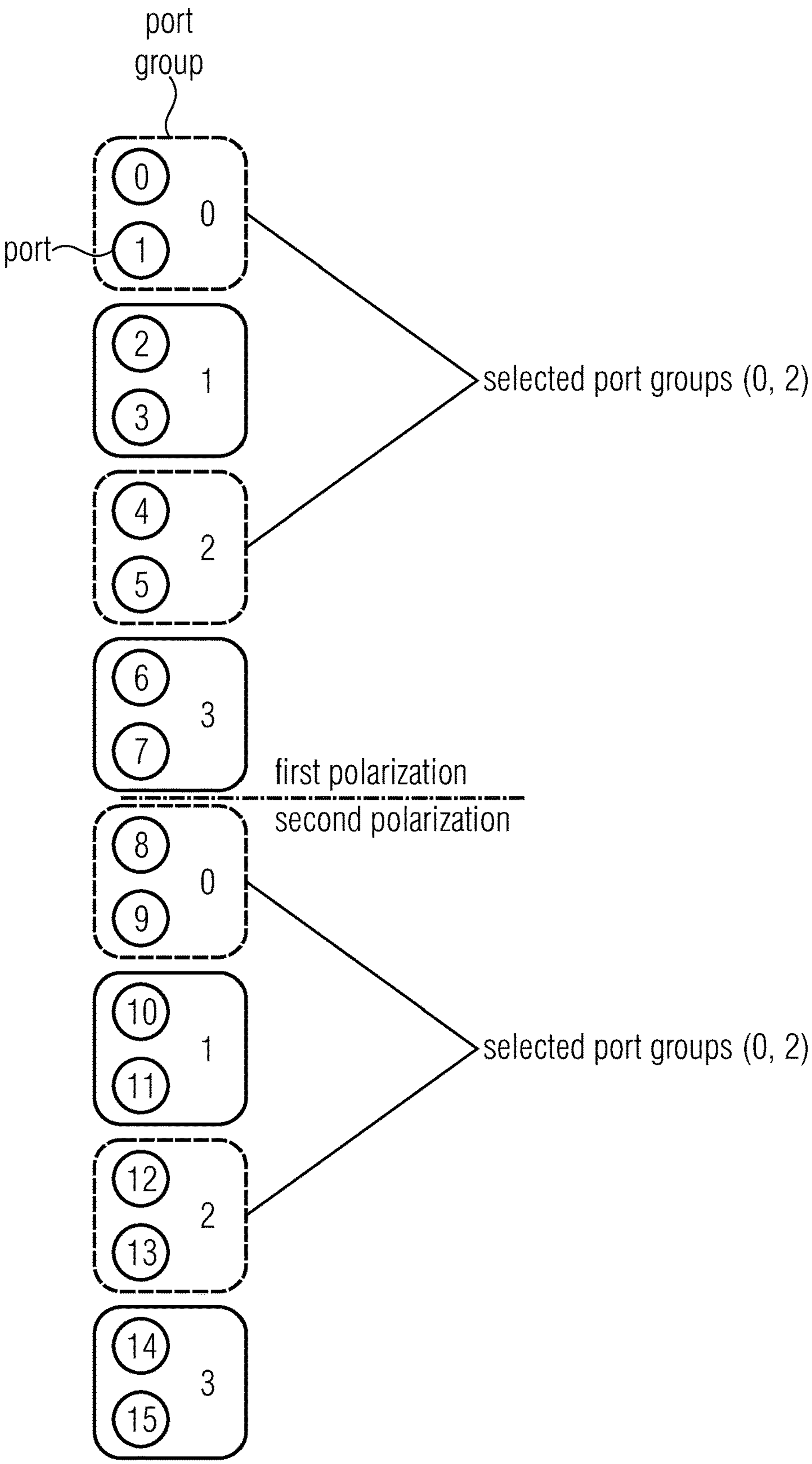
FIG. 8 illustrates the port grouping in accordance with an embodiment of the present invention for two polarizations and two transmission layers.

In accordance with embodiments, the above-mentioned port grouping is not dependent on the transmission layer, i.e., the port grouping is identical for all transmission layers. In accordance with another embodiment, the above-mentioned port grouping is dependent on the transmission layer, i.e., the port grouping is different per transmission layer or subset of transmission layers of the precoder matrix. FIG. 8 illustrates the port grouping in accordance with an embodiment of the present invention for two polarizations and L=2 transmission layers assuming P=16 CSI-RS ports 0 to 15 and $Z_1=Z_2=4$, port groups 0, 1, 2 and 3 per polarization.

In accordance with embodiments, the grouping of the CSI-RS ports\antenna ports is configured via a higher layer configuration (e.g., RRC) by the gNB or any other network node to the UE. The higher layer configuration may indicate the number of CSI-RS ports, P, the number of port groups, Z (or $Z_1$ and $Z_2$), and the number of CSI-RS ports per group. The number of CSI-RS ports per port group may be either indicated directly by the higher layer configuration, or the UE may determine the number of ports per group based on the parameters contained in the higher layer configuration. In one embodiment, the higher layer configuration includes the parameters P and Z, and the UE determines the $$\frac{P}{Z} CSI\text{-}RS$$

port indices per port group based on P and Z (see FIG. 6). In an embodiment, the higher layer configuration includes the parameters P and Z per polarization such that each group is associated with $$\frac{P}{2Z} CSI\text{-}RS$$

ports (see FIG. 7).

In accordance with embodiments, the parameters $Z_1$ and $Z_2$ are indicated by the higher layer configuration. In accordance with other embodiments, predefined ratios e.g., $$\frac{Z_1}{Z_2} = \frac{1}{1}, \frac{2}{1}, \frac{4}{1} \ldots$$

are indicated. In one embodiment, the higher layer configuration includes the parameters P and D, where D denotes the number of CSI-RS ports per group, and the UE determines the number of groups per polarization by $$Z = Z_1 = Z_2 = \frac{P}{2D}.$$

In one embodiment, the higher layer configuration includes the parameters P and D and the number of groups for the two polarizations, which is given by $$Z = \frac{P}{D}.$$

In one embodiment, the higher layer configuration contains the parameters P, Z and $D_z$ per port group (possibly per polarization), where $D_z$ is different per port group, per subset of port groups, or for the port groups per polarization.

The above-mentioned parameters may also depend on the transmission layer or transmission rank of the precoder matrix. This means the parameters may be different for different transmission layers and/or transmission ranks of the precoder matrix.

In accordance with embodiments, the grouping of the CSI-RS ports may be a priori known by the UE (e.g., the grouping is defined in specification), and the higher layer configuration from the gNB or any other network node only indicates the number of CSI-RS ports P. The grouping may be dependent on the value of the configured number of CSI-RS ports. For example, when P=32, the UE is configured with Z=8 port groups, or with $Z_1=Z_2=4$ port groups per polarization, and when P=16, the UE is configured with Z=4 port groups, or with $Z_1=Z_2=2$ port groups per polarization.

In accordance with embodiments, the UE is configured to select L (or to select less or equal than L) port groups from the configured Z port groups (or $Z=Z_1=Z_2$ port groups for both polarizations) for the calculation of the precoder matrix and to indicate the selected port groups in the CSI report. The selection of the port groups may be polarization dependent or polarization independent. In case of polarization-dependent selection, the UE selects L port groups (independent) per polarization. In such a case of polarization-independent port grouping, the UE selects identical L port group indices for the first and the second polarization. For example, when the UE is configured with $Z=Z_1=Z_2=4$ port groups per polarization and L=2, the UE selects for example the port groups ($Z_1$, $Z_2$) associated with the first polarization and the port groups ($Z_1$, $Z_2$) associated with the second polarization (see FIG. 8).

In another embodiment, the parameter L is identical to the number of port groups Z (or $L=Z_1$ and $L=Z_2$ for the two polarizations of the antenna ports). Hence, the UE is configured to use all Z port groups for the calculation of the precoder matrix. In such a case, the UE may not be configured with the parameter L.

The UE may be configured to select at least one port per selected (or configured) port group (optionally also per transmission layer) for the calculation of the precoder matrix.

The parameter L is either a higher layer (e.g., RRC) parameter (NumberofBeams) and configured by the gNB or any other network entity, or it is a priori known by the UE (e.g., fixed in specification), or it is selected and reported by the UE. Alternatively, the parameter L is derived from another parameter which is configured to the UE. For example, the number of ports, P, is configured by the network node and the parameter L is derived from the parameter P. Example values for L are $L \in \{2,3,4,6\}$. In another embodiment, the number of port groups, Z (or $Z_1$ and $Z_2$), is configured by the network node and the parameter L is derived from the parameter Z (or $Z_1$ and $Z_2$). Example values for L are $L \in \{2,3,4,6\}$.

When the value of L is higher layer configured, it is indicated for example by the parameter NumberOfPortGroups, and in one embodiment L=2 when P=4 and $L \in \{2, 4\}$ when P>4. In another embodiment, L=2 when P=4 and $L \in \{2,4\}$ when P>X. The value X is fixed, for example to 12, 16, 24, or 32.

In addition, the grouping may be dependent on or independent off the transmission layer of the precoding matrix. In a first embodiment, the selected port groups depend on the transmission layer of the precoder matrix, and may change or not per transmission layer. In a second embodiment, the selected port groups are identical for all transmission layers of the precoder matrix. In a third embodiment, the selected port groups are identical for a subset of the transmission layers of the precoder matrix. For example, a number of port groups is selected for a first layer and for a second layer, and configured to be identical, and a number of port groups is selected for a third layer and for a fourth layer, and configured to be identical. In another embodiment, the sum of the number of port groups over all transmission layers is fixed, and the UE is configured to select the number of port groups per transmission layer or subset of transmission layers. In another embodiment, the sum of the number of port groups or ports or sub-ports over all transmission layers is fixed, and the UE is configured to select a number of port groups or ports or sub-ports per transmission layer or subset of transmission layers, wherein the number of port groups or ports or sub-ports per transmission layer or subset of transmission layers is smaller (or not larger) than a maximum number of port groups, ports or sub-ports to be selected by the UE for a transmission layer or subset of transmission layers.

In accordance with embodiments, the UE is configured to include an information on the selected port groups in the CSI report. In one embodiment, the UE may indicate the selected L port groups by a Z-length bit-sequence where Z denotes the number of port groups for the two polarizations. Each bit in the bit-sequence is associated with one of the Z port groups. A bit indicating a '1' in the bit-sequence may indicate that the associated port group is selected and a '0' may indicate that the associated port group is not selected.

In one embodiment, the UE may indicate each selected port group by a $\log_2(Z)$ bit indicator. Alternatively, the UE may indicate the selected L port groups jointly by a $$\log_2\binom{Z}{L}$$

combinatorial bit-indicator. When the selected port groups are indicated per layer (or subset of layers) then the UE may report a bitmap, or a bit indicator as mentioned above per layer (or subset of layers). The parameter L may be dependent on the transmission layer. This means the UE may be configured to apply different values of L for the different transmission layers of the precoder matrix. The parameter L may be dependent on the transmission rank. This means the UE may be configured to apply different values of L for different transmission ranks of the precoder matrix.

In accordance with embodiments, the UE is configured to include an information on the selected port groups per polarization in the CSI report. In one embodiment, the UE may indicate the selected L port groups per polarization by a Z-length bit-sequence where Z denotes the number of port groups. Each bit in the bit-sequence is associated with one of the Z port groups. A bit indicating a '1' in the bit-sequence may indicate that the associated port group is selected and a '0' may indicate that the associated port group is not selected. In an embodiment, the UE may indicate each selected port groups by a $\log_2(Z)$ bit indicator. Alternatively, the UE may indicate the selected L port groups per polarization jointly by a $$\log_2\binom{Z}{L}$$

combinatorial bit-indicator. When the selected port groups are indicated per layer (or subset of layers) then the UE may report a bitmap, or a bit indicator as mentioned above per layer (or subset of layers).

In accordance with embodiments, the UE may be configured to select L' port groups, where L'≤L, and to indicate the selected port groups using one of the methods above in the CSI report. In addition, the UE may indicate the value of L' in the CSI report.

The following embodiment presents a method to reduce the signaling overhead for the indication of the selected port groups or ports or sub-ports in the CSI report.

In accordance with embodiments, the UE is configured to include an information on the selected port groups or ports and/or sub-ports in the CSI report. In one embodiment, the UE may indicate the selected R port groups or ports and/or sub-ports across all layers of the precoding vector or matrix by common port indicator in the CSI report. In addition, it may include a layer-specific indication of the selected port groups, ports or sub-ports per layer from the common port indicator in the CSI report. In some examples, the common port indicator is defined by an $$\left\lceil\log_2\binom{P}{R}\right\rceil \text{ or } \left\lceil\log_2\binom{P/2}{R}\right\rceil$$

combinatorial bit-indicator, where the parameter R is either higher layer configured to the UE from a network node, or selected by the UE (and reported), or fixed in the NR specification and hence known by the UE. In some examples, the layer-specific indicator is given by an $$\left\lceil\log_2\binom{R}{L}\right\rceil$$

combinatorial bit-indicator, where the parameter L is either higher layer configured to the UE from a network node, or selected by the UE (and reported), or fixed in the NR specification and hence known by the UE, or given by an R-length bitmap indicating the selected port groups, ports or sub-ports for a layer. Each bit in the bitmap is associated to a port group, port or sub-port indicated by the common port indicator. For instance, a '1' in the bitmap may indicate that the associated port group, port or sub-port from the common port indicator is selected, and a '0' in the bitmap may indicate that the associated port group, port or sub-port from the common port indicator is not selected.

Precoder Vector or Matrix Selection

The precoder vector or matrix may be expressed by a complex combination of vectors selected from the port-selection codebook(s). The UE is configured to select one or more vectors, or a vector combination from the codebook(s), wherein each vector of the codebook is associated with a port. Furthermore, the UE is configured to select a number of precoder coefficients for complex combining the selected vectors from the codebook(s). Note that for the two following embodiments of the precoder equation, it is assumed that each port group has a size of one, i.e., each port group contains only a single port.

In accordance with embodiments, the precoder vector or matrix may be expressed by a one or more vectors or by a combination of vectors selected from the port-selection codebooks, and the precoder matrix $P_n$ for the n-th transmission layer for the P ports and configured subbands or resource blocks is given by $$P_n = a_n \sum_{l=0}^{L-1} b_{n,l} p_{n,l},$$

where $\alpha_n$ is a normalization constant, $b_{n,l}$ is a vector selected from the codebook and associated with the l-th selected port, and $p_{n,l}$ is the precoder coefficient associated with the l-th selected port.

In accordance with embodiments, the precoder matrix may be expressed by one or more vectors or by a combination of vectors selected from the port-selection codebooks, and the precoder matrix $P_n$ for the n-th transmission layer and both polarizations of the P ports and configured subbands or resource blocks is given by $$P_n = a_n \begin{pmatrix} \sum_{l=0}^{L-1} (b_{n,l,1} p_{n,l,1}) \\ \sum_{l=0}^{L-1} (b_{n,l,2} p_{n,l,2}) \end{pmatrix}$$

where an is a normalization constant, $b_{n,l,1}$ is a vector selected from the codebook and associated with the first polarization and the l-th selected port, $b_{n,l,2}$ is a vector selected from the codebook and associated with the second polarization and the l-th selected port, $p_{n,l,1}$ is the precoder coefficient associated with the first polarization and the l-th selected port, and $p_{n,l,2}$ is the precoder coefficient associated with the second polarization and the l-th selected port.

In the above equations of the precoder matrix, the port group vector bnl depends on the transmission layer. In case of an identical port selection for all transmission layers, $b_{n,l}=b_l$, $\forall$n.

In the above equations of the precoder matrix, the port group vector $b_{n,l,p}$ depends on the polarization index p. In case of an identical port selection for the both polarizations, $b_{n,l,p}=b_{n,l}$, $\forall$p. In case of an identical port selection for the both polarizations and all transmission layers, $b_{n,l,p}=b_l$, $\forall$n, p.

The precoder matrix may also be expressed by a complex combination of vectors selected from two port-selection codebooks. The UE is configured to select one or more vectors, or a vector combination, from a first codebook, wherein each vector of the first codebook is associated with a port group, and to select one or more vectors, or a vector combination from a second codebook, wherein each vector of the second codebook is associated with a port of a port group. Furthermore, the UE is configured to select a number of precoder coefficients for complex combining the selected vectors from the two codebooks.

In an embodiment, the first codebook comprises a number of vectors of equal size Z×1. The n-th vector of the first codebook includes or consists of zero-valued elements, expect the n-th element which is one.

When the number of ports per group is identical for all Z port groups, the second codebook comprises a number of vectors of equal size D×1, where $$D=\frac{P}{Z} \text{ and } D=\frac{P}{2Z}$$

in case of polarization-dependent and polarization-independent port grouping, respectively. The p-th vector of the second codebook includes or consists of zero-valued elements, expect the p-th element which is one. When the number of ports per group is non-identical for the Z port groups, the second codebook may comprise sets of vectors of different sizes, wherein each set is associated with a port group.

In an embodiment, the number of ports per group is identical for all port groups and the precoder matrix $P_n$ for the n-th transmission layer for the P ports and configured subbands or resource blocks is given by $$P_n=\alpha_n\sum_{l=0}^{L-1}\left(b_{n,l}\otimes\sum_{d=0}^{D-1}d_{n,l,d}p_{n,l,d}\right),$$

where

'$\otimes$' denotes the Kronecker product, $\alpha_n$ is a normalization constant, $b_{n,l}$ is a vector selected from the first codebook and associated with the l-th selected port group, $d_{n,l,d}$ is a vector selected from the second codebook and associated with the d-th selected port of the l-th selected port group, and $p_{n,l,d}$ is the precoder coefficient associated with the d-th selected port of the l-th selected port group.

Alternatively, the above precoder equation may be formulated by $$P_n=\alpha_n\sum_{l=0}^{L-1}\sum_{d=0}^{D-1}vec\{d_{n,l,d}b_{n,l}^T\}p_{n,l,d},$$

where

'vec { . . . }' denotes the operation to form a column vector from a matrix.

Alternatively, the above precoder equation may be formulated by $$P_n=\alpha_n\sum_{l=0}^{L-1}\sum_{d=0}^{D-1}\left[b_{n,l}(0)d_{n,l,d}^T, \dots , b_{n,l}(Z-1)d_{n,l,d}^T\right]^T p_{n,l,d},$$

where $b_{n,l}(z)$ denotes the z-th element of vector $b_{n,l}$.

In another embodiment, the number of ports per group is identical for all port groups and the port grouping is polarization-dependent such that the precoder matrix $P_n$ for the n-th transmission layer and both polarizations of the P ports and configured subbands or resource blocks is given by $$P_n=\alpha_n\begin{pmatrix}\sum_{l=0}^{L-1}\left(b_{n,l,1}\otimes\sum_{d=0}^{D-1}d_{n,l,d,1}p_{n,l,d,1}\right)\\ \sum_{l=0}^{L-1}\left(b_{n,l,2}\otimes\sum_{d=0}^{D-1}d_{n,l,d,2}p_{n,l,d,2}\right)\end{pmatrix}$$

where $b_{n,l,1}$ is a vector which is associated with the first polarization and selected from the first codebook and associated with the l-th selected port group, $b_{n,l,2}$ is a vector which is associated with the second polarization and selected from the first codebook and associated with the l-th selected port group, $d_{n,l,d,1}$ is a $$\frac{P}{2Z}\times 1$$

vector selected from the second codebook and associated with the first polarization, the l-th port group and the d-th selected port, $d_{n,l,d,2}$ is a $$\frac{P}{2Z}\times 1$$

vector selected from the second codebook and associated with the second polarization, the l-th selected port group and the d-th selected port, $p_{n,l,d,1}$ is the precoder coefficient associated with the d-th selected port of the l-th selected port group of the first polarization, and $p_{n,l,d,2}$ is the precoder coefficient associated with the d-th selected port of the l-th selected port group of the second polarization.

Alternatively, the above precoder equation may be formulated by $$P_n = \alpha_n \begin{pmatrix} \sum_{l=0}^{L-1} \sum_{d=0}^{D-1} \left[ b_{n,l,1}(0) d_{n,l,d,1}^T b_{n,l,1}(1) d_{n,l,d,1}^T, \dots, b_{n,l,1}(Z_1 - 1) d_{n,l,d,1}^T \right]^T p_{n,l,d,1} \\ \sum_{l=0}^{L-1} \sum_{d=0}^{D-1} \left[ b_{n,l,2}(0) d_{n,l,d,2}^T b_{n,l,2}(1) d_{n,l,d,2}^T, \dots, b_{n,l,2}(Z_2 - 1) d_{n,l,d,2}^T \right]^T p_{n,l,d,2} \end{pmatrix},$$

where $b_{n,l,p}(z)$ denotes the z-th element of vector $b_{n,l,p}$.

Alternatively, the above precoder equation may be formulated by $$P_n = \alpha_n \begin{pmatrix} \sum_{l=0}^{L-1} \sum_{d=0}^{D-1} \left[ b_{n,l}(0) d_{n,l,d}^T, b_{n,l}(1) d_{n,l,d}^T, \dots, b_{n,l}(Z_1 - 1) d_{n,l,d}^T \right]^T p_{n,l,d} \\ \sum_{l=0}^{L-1} \sum_{d=0}^{D-1} \left[ b_{n,l+L}(0) d_{n,l+L,d}^T, b_{n,l+L}(1) d_{n,l+L,d}^T, \dots, b_{n,l+L}(Z_2 - 1) d_{n,l+L,d}^T \right]^T p_{n,l+L,d} \end{pmatrix},$$

where $b_{n,l}(z)$, $l<L$ denotes the z-th element of vector $b_{n,l,1}$, $b_{n,l}(z)$, $l>L-1$ denotes the z-th element of vector $b_{n,l,2}$, $d_{n,l}$, $l<L$ denotes vector $d_{n,l,1}$, and $d_{n,l}$, $l>L-1$ denotes vector $d_{n,l,2}$.

In the above equations of the precoder matrix, the port group vector bnl depends on the transmission layer. As mentioned above, in case of identical port grouping for all transmission layers, $b_{n,l}=b_l$, $\forall$n.

In another embodiment, the number of ports per group is identical for all port groups and the port grouping is polarization-independent (i.e., identical for both polarizations of the ports) such that the precoder matrix $P_n$ for the n-th transmission layer and both polarizations of the P ports and configured subbands or resource blocks is given by $$P_n = \alpha_n \begin{pmatrix} \sum_{l=0}^{L-1} \left( b_{n,l} \otimes \sum_{d=0}^{D-1} d_{n,l,d,1} p_{n,l,d,1} \right) \\ \sum_{l=0}^{L-1} \left( b_{n,l} \otimes \sum_{d=0}^{D-1} d_{n,l,d,2} p_{n,l,d,2} \right) \end{pmatrix}$$

where $b_{n,l}$ is a vector which is identical for both polarizations and selected from the first codebook and associated with the l-th selected port group, $d_{n,l,d,1}$ is a $$\frac{P}{2Z} \times 1$$

vector selected from the second codebook and associated with the first polarization, the l-th selected port group and the d-th selected port, $d_{n,l,d,2}$ is a $$\frac{P}{2Z} \times 1$$

vector selected from the second codebook and associated with the second polarization, the l-th selected port group and the d-th selected port, $P_{n,l,d,1}$ is the precoder coefficient associated with the d-th selected port of the l-th selected port group of the first polarization, and $P_{n,l,d,2}$ is the precoder coefficient associated with the d-th selected port of the l-th selected port group of the second polarization.

In the above equations of the precoder matrix, the port group vector $b_{n,l}$ depends on the transmission layer. As mentioned above, in case of identical port grouping for all transmission layers, $b_{n,l}=b_l$, $\forall$n.

The precoder matrix may also be expressed by a complex combination of vectors selected from a single port-selection codebook. The port-selection codebook then comprises sets of vectors, wherein each set of vectors is associated with a different port group and each vector within a set is associated with a port of the port group. The UE is configured to select one or more vector sets (port groups) from the codebook and vectors (ports) within the sets.

In an embodiment, the precoder matrix $P_n$ for the n-th transmission layer and both polarizations of the P ports and configured subbands or resource blocks is then given by $$P_n = \alpha_n \begin{pmatrix} \sum_{l=0}^{L-1} \sum_{d=0}^{D-1} b_{n,l,d,1} p_{n,l,d,1} \\ \sum_{l=0}^{L-1} \sum_{d=0}^{D-1} b_{n,l,d,1} p_{n,l,d,1} \end{pmatrix}$$

where $b_{n,l,d,1}$ is a vector selected from the codebook and associated with the d-th selected port of the l-th selected port group associated with the first polarization, $b_{n,l,d,2}$ is a vector selected from the codebook and associated with the d-th selected port of the I-th selected port group associated with the second polarization, $P_{n,l,d,1}$ is the precoder coefficient associated with the d-th selected port of the l-th selected port group of the first polarization, and $P_{n,l,d,2}$ is the precoder coefficient associated with the d-th selected port of the l-th selected port group of the second polarization.

In the above equations of the precoder matrix, the port group vector $b_{n,l,d,1}$ or $b_{n,l,d,2}$ depends on the transmission layer. As mentioned above, in case of identical port grouping for all transmission layers, $b_{n,l,d,t}=b_{l,d,t}$, $\forall$n, t=1,2.

The selected port groups may be identical for the vectors $b_{n,l,d,1}$ and $b_{n,l,d,2}$ for the both polarizations in case of polarization-independent port grouping.

In accordance with embodiments, the UE may be configured to report the selected port groups and selected ports in a wideband manner for the entire CSI reporting band. For example, the L or L' port groups per polarization are selected and indicated in the CSI report by an index $q_1$, where $$q_1 \in \left\{0, 1, \ldots, \left\lceil \frac{Z}{2\bar{d}} \right\rceil - 1\right\},$$

which requires $$\left\lceil \log_2 \left\lceil \frac{Z}{2\bar{d}} \right\rceil \right\rceil \text{ bits.}$$

bits. The value of $\bar{d}$ is configured with the RRC parameter PortSelectionSamplingSize. In an embodiment, $\bar{d}$ is an integer, e.g., $\bar{d} \in \{1,2,3,4\}$, and $$\bar{d} \le \min\left(\left\lceil \frac{Z}{2} \right\rceil, L\right)$$

or $$\bar{d} \le \min\left(\left\lceil \frac{Z}{2} \right\rceil, L'\right).$$

The L or L' port-group selection vectors are then given by $b_{n,q_1\bar{d}+i}$, or $b_{n,q_1\bar{d}+i,d,t}$, i=0, . . . , L−1 or i=0, . . . , L'−1.

In accordance with embodiments, the CSI report comprises a PMI indicated the selected precoding matrix or vector for each transmission layer.

In accordance with embodiments, the precoding vector or matrix for each transmission layer is defined for a number of subbands, $N_3$, or PRBs or frequency domain units/components used for PMI reporting and based on one or more vectors or one or more combinations of vectors selected from a port-selection codebook and a delay codebook comprising D vectors and a set of precoding coefficients, wherein each vector from the port-selection codebook is associated with one of the antenna ports or one of the sub-ports, and each vector from the delay codebook is associated with a delay or delay index of the precoder and represented by a DFT-based vector for the $N_3$ subbands of the precoder vector or matrix.

In accordance with embodiments, the delay codebook comprises D DFT-based vectors for the $N_3$ subbands, wherein each vector is of size $N_3 \times 1$ and associated with a delay index. In one option, $D=N_3$ such that the delay codebook is defined by a $N_3 \times N_3$ DFT-based matrix or DFT matrix or IDFT-matrix $[a_0, a_1, \ldots a_{N_3-1}]$, wherein the vector $a_i$ of size $N_3 \times 1$ is associated with delay or delay index "i". In another option, $D<N_3$ and the delay codebook comprises the first D DFT-based vectors or DFT-vectors or IDFT-vectors $(a_0, \ldots, a_{D-1})$. In another option, the D vectors of the delay codebook are associated with the indices $a_i$, $\forall i=0, \ldots, D-1$ from the delay codebook containing $N_3$ DFT-based vectors, where $a_i=\mathrm{mod}(a_s+i, N_3)$, $\forall i=0, \ldots, D-1$, and wherein as is the starting index of the vector from the delay codebook containing $N_3$ DFT-based vectors. The delay codebook then comprises the D vectors $(a_{mod(a_s+0,N_3)}, \ldots, a_{mod(a_s+D-1,N_3)})$. In another option, the D DFT-based or DFT- or IDFT-vectors are associated with the indices $a_{i_n}$, $\forall i_n=0, \ldots, D_n-1$, $\forall n=0 \ldots N-1$ from the delay codebook containing $N_3$ DFT-based vectors, where $a_{i_n}=\mathrm{mod}(a_{s_n}+i_n, N_3)$, $\forall i_n=0, \ldots, D_n-1$, and wherein $a_{s_n}$ is the starting index of the vector from the delay codebook containing $N_3$ vectors for parameter n, and wherein $$\sum_{n=0}^{N-1} D_n = D$$

and $a_s \ne a_{s_n}$, $\forall n$. The delay codebook comprises the $D_n$ vectors $$\left(a_{mod(a_{s_n}+0,N_3)}, \ldots, a_{mod(a_{s_n}+D_n-1,N_3)}\right).$$

In some examples, $a_s$ or $a_{s_n}$, $\forall n$ and/or N is configured to the UE from the network node. Here, mod(a, b) denotes the modulo function of a modulo b.

In accordance with embodiments, the parameter D or parameters $D_n$ representing the number of DFT-based vectors of the delay codebook is/are configured to the UE from the network node, or fixed in the NR specification and hence known by the UE.

In accordance with embodiments, the precoding vector for a transmission layer is based on L vectors selected from the port-selection codebook and D or less than D vectors selected from the delay codebook. The UE is configured to indicate the vectors selected from the port-selection codebook and from the delay codebook in the CSI report. The precoding vector or matrix $W^n$ for the n-th transmission layer may be defined by $$W^n = W_{1,n} W_{2,n} W_{f,n}^H, \text{ or}$$

$$W^n = \sum_{l=0}^{L-1} \sum_{d=0}^{D-1} p_{n,l,d}\left(d_{n,l} a_{n,l,d}^H\right) = \sum_{d=0}^{D-1} \sum_{l=0}^{L-1} p_{n,l,d}\left(d_{n,l} a_{n,l,d}^H\right),$$

$$W^n = \sum_{l=0}^{L-1} \sum_{d=0}^{D-1} p_{n,l,d,t}\left(d_{n,l} a_{n,l,d}^H\right) = \sum_{d=0}^{D-1} \sum_{l=0}^{L-1} p_{n,l,d,t}\left(d_{n,l} a_{n,l,d}^H\right), \text{ or}$$

$$W^n = \begin{bmatrix} \sum_{l=0}^{L-1} \sum_{d=0}^{D-1} p_{n,l,d}\left(d_{n,l} a_{n,l,d}^H\right) \\ \sum_{l=0}^{L-1} \sum_{d=0}^{D-1} p_{n,l+L,d}\left(d_{n,l+L} a_{n,l+L,d}^H\right) \end{bmatrix},$$

where $W_{1,n}$ is a matrix comprising L selected vectors from the port-selection codebook, $W_{2,n}$ is a coefficient matrix, $$W_{f,n}^H$$

is a matrix comprising D or less than D vectors from the delay codebook $d_{n,l}$ is a P×1 vector or P/2×1 vector selected from the port-selection codebook, $a_{n,l,d}$ is a $N_3 \times 1$ vector selected from the delay codebook, $P_{n,l,d}$ is a complex precoder coefficient or combining coefficient, and $P_{n,l,d}$ is a complex precoder coefficient or combining coefficient for the t-th polarization (t=1,2).

The above-mentioned parameters L and/or D may be dependent on the transmission layer or transmission rank (RI) of the precoder matrix. This means the parameters may be different for different transmission layers or RI values of the precoder matrix.

In accordance with embodiments, the UE is configured to include the selected precoder coefficients for the transmission layers of the precoder matrix in the CSI report.

Quantization of Precoder Coefficients

In accordance with embodiments, the UE is configured to decompose and report the selected complex precoder coefficients $\{p_{n,l,d}\}$ (or $\{p_{n,l,d,t}\}$ $(t\in\{1,2\})$) per layer separately as $$p_{n,l,d} = a^{(1)}_{n,l,d} a^{(2)}_{n,l,d} a^{(3)}_{n,l,d} \varphi_{n,l,d},$$

$$\left(p_{n,l,d,t} = a^{(1)}_{n,l,d,t} a^{(2)}_{n,l,d,t} a^{(3)}_{n,l,d,t} \varphi_{n,l,d,t}\right)$$

where $a^{(1)}_{n,l,d}\left(a^{(1)}_{n,l,d,t}\right)$ is a first amplitude coefficient, $a^{(2)}_{n,l,d}\left(a^{(2)}_{n,l,d,t}\right)$ is a second amplitude coefficient, $a^{(3)}_{n,l,d}\left(a^{(3)}_{n,l,d,t}\right)$ is a third amplitude coefficient, $\varphi_{n,l,d}(\varphi_{n,l,d,t})$ is a phase coefficient.

In one option, n may be the layer index, l is the port-group index, d is the port or sub-port index, and $t\in\{1,2\}$ is an index indicating the polarization of the coefficient.

In another option, n may be the layer index, l is the port index or sub-port index, d is the delay index. The parameter $t\in\{1,2\}$ is an index indicating the polarization of the coefficient.

In one option, the CSI report may contain for each selected precoder coefficient a quantized value of the amplitude coefficient and a quantized value of the phase coefficient. Each selected precoder coefficient is decomposed into a quantized value of an amplitude coefficient and a quantized value of a phase coefficient.

In one option, the CSI report may contain for each selected precoder coefficient a quantized value of the first amplitude coefficient, a quantized value of the second amplitude coefficient and a quantized value of the phase coefficient. Each selected precoder coefficient is decomposed into a quantized value of a first amplitude coefficient, a second amplitude coefficient and a quantized value of a phase coefficient In one option, the CSI report may contain for each selected precoder coefficient a quantized value of the first amplitude coefficient, a quantized value of the second amplitude coefficient, a quantized value of the third amplitude coefficient and a quantized value of the phase coefficient. Each selected precoder coefficient is decomposed into a quantized value of a first amplitude coefficient, a second amplitude coefficient, a third amplitude coefficient and a quantized value of a phase coefficient.

The CSI report may contain for each selected precoder coefficient a quantized value of the first amplitude coefficient, possibly a quantized value of the second amplitude coefficient, possible a quantized value of the third amplitude coefficient, and a quantized value of the phase coefficient.

A phase coefficient may be selected either from a QPSK, 8PSK, or 16QPSK alphabet and configured by the value $N_{PSK}$ (alphabet size). In one embodiment, the value of $N_{PSK}$ is configured with the higher layer parameter PhaseAlphabetSize. In another embodiment, the value of $N_{PSK}$ is fixed, for example to $N_{PSK}=8$ or $N_{PSK}=16$.

The phase coefficients may be reported per complex precoder coefficient $p_{n,l,d}$ (or $\{p_{n,l,d,t}\}$ $(t\in\{1,2\})$).

In an embodiment, the first amplitude coefficients $$a^{(1)}_{n,l,d}$$

and the second amplitude coefficients $$a^{(2)}_{n,l,d}$$

are common for all (l, d). In this case, $$a^{(1)}_{n,l,d} = 1 \text{ and } a^{(2)}_{n,l,d} = 1$$

are fixed and not reported. In one embodiment, an amplitude coefficient $$a^{(3)}_{n,l,d}$$

is reported per precoder coefficient (possibly except for the strongest coefficient whose amplitude coefficient is not reported). This means, each selected precoder coefficient is decomposed into an amplitude coefficient and a phase coefficient. An amplitude coefficient and a phase coefficient are reported per precoder coefficient.

In an embodiment, the first amplitude coefficients $$a^{(1)}_{n,l,d}$$

are common for all (l, d). In this case, $$a^{(1)}_{n,l,d} = 1$$

is fixed and not reported. In one embodiment, the amplitude coefficients $$a^{(2)}_{n,l,d}$$

are common for all indices d, and one amplitude coefficient $$a^{(2)}_{n,l,d}$$

is reported per index l (l=0, . . . , L−1) and one amplitude coefficient $$a^{(3)}_{n,l,d}$$

is reported per precoder coefficient (possibly except for the strongest coefficient whose amplitude coefficient is not reported). This means, each selected precoder coefficient is decomposed into a first amplitude coefficient, a second amplitude coefficient, a third amplitude coefficient and a phase coefficient. The second amplitude coefficient is reported per index l (l=0, . . . , L−1) and the third amplitude coefficient is reported per precoder coefficient. Note that in one option an amplitude coefficient is only reported if the precoder coefficient or the amplitude coefficient is non-zero.

In another embodiment, the amplitude coefficients $$a_{n,l,d}^{(2)}$$

are common for all indices l, and one amplitude coefficient $$a_{n,l,d}^{(2)}$$

is reported per index d (d=0, . . . , D−1) and one amplitude coefficient $$a_{n,l,d}^{(3)}$$

is reported per precoder coefficient (possibly except for the strongest coefficient whose amplitude coefficient is not reported). This means, each selected precoder coefficient is decomposed into a first amplitude coefficient, a second amplitude coefficient, a third amplitude coefficient and a phase coefficient. The second amplitude coefficient is reported per index d (d=0, . . . , D−1) and the third amplitude coefficient is reported per precoder coefficient. Note that in one option an amplitude coefficient is only reported if the precoder coefficient or the amplitude coefficient is non-zero.

In an embodiment, the first amplitude coefficients $$a_{n,l,d,t}^{(1)}$$

are common for all (l, d, t). In this case, $$a_{n,l,d,t}^{(1)} = 1$$

is fixed and not reported. In one embodiment, the amplitude coefficients $$a_{n,l,d,t}^{(2)}$$

are common for all indices d, and one amplitude coefficient $$a_{n,l,d,t}^{(2)}$$

is reported per index l (l=0, . . . , L−1) and per index t (t∈{1,2}) and one amplitude coefficient $$a_{n,l,d,t}^{(3)}$$

is reported per precoder coefficient (possibly except for the strongest coefficient whose amplitude coefficient is not reported). In another embodiment, the amplitude coefficients $$a_{n,l,d,t}^{(2)}$$

are common for all indices d and indices t, and one amplitude coefficient $$a_{n,l,d,t}^{(2)}$$

is reported per index l (l=0, . . . , L−1) and one amplitude coefficient $$a_{n,l,d,t}^{(3)}$$

coefficient (possibly except for the strongest coefficient whose amplitude coefficient is not reported). In another embodiment, the amplitude coefficients $$a_{n,l,d,t}^{(2)}$$

are common for all indices l, and one amplitude coefficient $$a_{n,l,d}^{(2)}$$

is reported per index d (d=0, . . . , D−1) and per index t (t∈{1,2}) and one amplitude coefficient $$a_{n,l,d,t}^{(3)}$$

is reported per precoder coefficient (possibly except for the strongest coefficient whose amplitude coefficient is not reported). In another embodiment, the amplitude coefficients $$a_{n,l,d,t}^{(2)}$$

are common for all indices l and indices t, and one amplitude coefficient $$a_{n,l,d,t}^{(2)}$$

is reported per index d (d=0, . . . , D−1) and one amplitude coefficient $$a_{n,l,d,t}^{(3)}$$

is reported per precoder coefficient (possibly except for the strongest coefficient whose amplitude coefficient is not reported). Note that in one option an amplitude coefficient is only reported if the precoder coefficient or the amplitude coefficient is non-zero.

In an embodiment, the first amplitude coefficients $$a_{n,l,d,t}^{(1)}$$

are common for all (l, d). In this case, $$a_{n,l,d,t}^{(1)} = 1$$

is fixed and not reported. In one embodiment, the amplitude coefficients $$a_{n,l,d,t}^{(2)}$$

are common for all (l, d) per polarization and one amplitude coefficient is reported per layer. In this case, $$a_{n,l,d,t}^{(2)} = 1$$

is fixed for t=1 or t=2, and hence not reported for one polarization, and $$a_{n,l,d,t}^{(2)} \text{ for } t = 2 \text{ or } t = 1$$

is reported to the other polarization. An amplitude coefficient $$a_{n,l,d,t}^{(3)}$$

is reported per precoder coefficient (possibly except for the strongest coefficient whose amplitude coefficient is not reported). Note that in one option an amplitude coefficient is only reported if the precoder coefficient or the amplitude coefficient is non-zero.

In an embodiment, the first amplitude coefficients $$a_{n,l,d,t}^{(1)}$$

are common for all d, and one amplitude coefficient is reported per index l and per index t. The second amplitude coefficients $$a_{n,l,d,t}^{(2)}$$

are common for all l, and one amplitude coefficient is reported per index d and per index t, or the second amplitude coefficients $$a_{n,l,d,t}^{(2)}$$

are common for all l and t, and one amplitude coefficient is reported per index d. An amplitude coefficient $$a_{n,l,d,t}^{(3)}$$

is reported per precoder coefficient (possibly except for the strongest coefficient whose amplitude coefficient is not reported). Note that in one option an amplitude coefficient is only reported if the precoder coefficient or the amplitude coefficient is non-zero.

Note that for all of the above options, in one method an amplitude coefficient is only reported if the precoder coefficient or the amplitude coefficient is non-zero.

In an embodiment, for the amplitude coefficient reporting, a 4-bit amplitude codebook is used for $$\{a_{n,l,d}^{(1)}\} \text{ (or } \{a_{n,l,d,t}^{(1)}\}) \text{ and/or } \{a_{n,l,d}^{(2)}\} \text{ (or } \{a_{n,l,d,t}^{(2)}\}).$$

An embodiment is shown in Table 1 below:

TABLE 1

Mapping of $a_{n,l,d}^{(1)}$ or $a_{n,l,d,t}^{(1)}$ or $a_{n,l,d}^{(2)}$ or $a_{n,l,d,t}^{(2)}$ to indices $k_{n,l,d}^{(1)}$ or $k_{n,l,d,t}^{(1)}$ or $k_{n,l,d}^{(2)}$ or $k_{n,l,d,t}^{(2)}$

| $k_{n,l,d}^{(1)}$ | $a_{n,l,d}^{(1)}$ |
|---|---|
| 0 | 0 or reserved |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |

TABLE 1-continued

| Mapping of $a^{(1)}_{n,l,d}$ or $a^{(1)}_{n,l,d,t}$ or $a^{(2)}_{n,l,d}$ or $a^{(2)}_{n,l,d,t}$ to indices $k^{(1)}_{n,l,d}$ or $k^{(1)}_{n,l,d,t}$ or $k^{(2)}_{n,l,d}$ or $k^{(2)}_{n,l,d,t}$ | |
|---|---|
| $k^{(1)}_{n,l,d}$ | $a^{(1)}_{n,l,d}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

In an embodiment, for the amplitude coefficient reporting, a 3-bit amplitude codebook is used for $$\{a^{(1)}_{n,l,d}\}\ (\text{or } \{a^{(1)}_{n,l,d,t}\})\ \text{and/or } \{a^{(2)}_{n,l,d}\}\ (\text{or } \{a^{(2)}_{n,l,d,t}\}).$$

An embodiment is shown in Table 2 below:

TABLE 2

| Mapping of $a^{(1)}_{n,l,d}$ or $a^{(1)}_{n,l,d,t}$ or $a^{(2)}_{n,l,d}$ or $a^{(2)}_{n,l,d,t}$ to indices $k^{(1)}_{n,l,d}$ or $k^{(1)}_{n,l,d,t}$ or $k^{(2)}_{n,l,d}$ or $k^{(2)}_{n,l,d,t}$. | |
|---|---|
| $k^{(1)}_{n,l,d}$ | $a^{(1)}_{n,l,d}$ |
| 0 | 0 or reserved |
| 1 | $\frac{1}{\sqrt{64}}$ |
| 2 | $\frac{1}{\sqrt{32}}$ |
| 3 | $\frac{1}{\sqrt{16}}$ |
| 4 | $\frac{1}{\sqrt{8}}$ |
| 5 | $\frac{1}{\sqrt{4}}$ |
| 6 | $\frac{1}{\sqrt{2}}$ |
| 7 | 1 |

In an embodiment, for the amplitude coefficient reporting, a 3-bit amplitude codebook is used for $$\{a^{(3)}_{n,l,d}\}\ (\text{or } \{a^{(3)}_{n,l,d,t}\}).$$

An embodiment is shown in Table 3 below:

TABLE 3

| Mapping of $a^{(3)}_{n,l,d}$ or $a^{(3)}_{n,l,d,t}$ to indices $k^{(3)}_{n,l,d}$ or $k^{(3)}_{n,l,d,t}$. | |
|---|---|
| $k^{(3)}_{n,l,d}$ | $a^{(3)}_{n,l,d}$ |
| 0 | $\frac{1}{8\sqrt{2}}$ |
| 1 | ⅛ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

In another embodiment, for the amplitude coefficient reporting, a 1-bit amplitude codebook is used for $$a^{(3)}_{n,l,d}\}(\text{or } \{a^{(3)}_{n,l,d,t}\}).$$

Embodiments are shown in Table 4 and Table 5 below:

TABLE 4

| Mapping of $a^{(3)}_{n,l,d}$ or $a^{(3)}_{n,l,d,t}$ to indices $k^{(3)}_{n,l,d}$ or $k^{(3)}_{n,l,d,t}$. | |
|---|---|
| $k^{(3)}_{n,l,d}$ | $a^{(3)}_{n,l,d}$ |
| 0 | 0 |
| 1 | 1 |

TABLE 5

| Mapping of $a^{(3)}_{n,l,d}$ or $a^{(3)}_{n,l,d,t}$ to indices $k^{(3)}_{n,l,d}$ or $k^{(3)}_{n,l,d,t}$. | |
|---|---|
| $k^{(3)}_{n,l,d}$ | $a^{(3)}_{n,l,d}$ |
| 0 | $\frac{1}{\sqrt{2}}$ |
| 1 | 1 |

In Table 1 and Table 2, the first field (quantized value) may be either zero or 'reserved'. The field is 'reserved' when only non-zero precoder coefficients are reported by the UE.

Selection of Non-Zero Precoder Coefficients

When the number of precoder coefficients that may be selected by the UE is not restricted, the UE may select a large number of precoder coefficients for the calculation of the precoder matrix. Some of the selected precoder coefficients may have only a small amplitude and may not significantly contribute to the performance of the precoder. Therefore, in accordance with embodiments, the UE may be configured to select and to report not more than $K_0$ non-zero precoder coefficients per layer (or subset of layers or all layers).

In one embodiment, the parameter $K_0$ is configured by the gNB (or any other network node). By doing so, the feedback overhead of the CSI report may be controlled by the gNB. In another embodiment, the parameter $K_0$ is a priori known at the UE. In another embodiment, the parameter $K_0$ is derived by the UE based on the higher layer configuration of the port grouping (i.e., based on the parameters P and/or Z and/or D). Furthermore, the UE may be configured to indicate the selected number of non-zero precoder coefficients $K_1 \leq K_0$ per layer (or subset of layers or all layers) in the CSI report.

When the UE is configured to report not more than $K_0$ non-zero precoder coefficients per layer, $K_0 \leq 2LD$ for the polarization-independent port grouping. When the UE is configured to report not more than $K_0$ non-zero precoder coefficients for all layers, $K_0 \leq r2LD$, $r \in (0, RI)$ for the polarization-independent port grouping, where the parameter r is not greater than the transmission rank (RI) and a priori known at the UE, or configured by the network node. For example, $r \in \{0.5, 1, 2\}$. In one embodiment, the UE is configured to report not more than $K_0$ non-zero precoder coefficients for all layers, where $K_0 \leq r2LD$, and not more than $$K_0'(K_0' \leq 2LD)$$

precoder coefficients per layer for the polarization-independent port grouping.

Indication of Non-Zero Precoder Coefficients

In accordance with embodiments, the UE is configured to indicate the selected non-zero precoder coefficients in the CSI report. For example, the UE may indicate the selected non-zero precoder coefficients by a bitmap, wherein each bit in the bitmap is associated with a port group and port (and hence a precoder coefficient). A '1' in the bitmap indicates that the associated precoder coefficient is non-zero, selected and reported by the UE. A '0' in the bitmap indicates that the associated precoder coefficient is not selected and not reported by the UE. For example, the bitmap may have a size of 2L×D, where L and D denote the number of selected port groups per polarization and ports per port group, respectively, or where L and D denote the number of selected ports or sub-ports per polarization and delays, respectively.

In another embodiment, the UE indicates the selected non-zero precoder coefficients by a combinatorial indicator. For example, the UE indicates the selected non-zero precoder coefficients by a $$\log_2\binom{2LD}{K_1}$$

combinatorial indicator, where $K_1$ denotes the number of selected coefficients by a non-zero precoder coefficients, 2L the number of port groups or ports or sub-ports for both polarizations and D the number of ports per port group or delays.

In another embodiment, the UE indicates the selected non-zero precoder coefficients by a combinatorial indicator. For example, the UE indicates the selected non-zero precoder coefficients by a $$\log_2\binom{2LD}{K_0}$$

combinatorial indicator, where $K_0$ denotes the number of configured precoder coefficients, 2L the number of port groups for both polarizations and D the number of ports per port group, or 2L the number of ports or sub-ports for both polarizations and D the number of delays.

In accordance with embodiments, the UE may be configured to select D' ports within a port group, where D'≤D. In addition, the UE may indicate the selected ports within the groups using one of the methods above (e.g., bitmap of size 2L×D' or combinatorial indicator $$\log_2\binom{2LD'}{K_1})$$

in the CSI report. In addition, the UE may indicate the value of D' in the CSI report.

Indication of Strongest Coefficient

In accordance with embodiments, the UE is configured to normalize the precoder coefficients per transmission layer with respect to the strongest coefficient such that the strongest coefficient has an amplitude value of 1. In order to reduce the feedback overhead for the CSI reporting of the precoder coefficients, the UE is configured not to report the amplitude and phase of the strongest coefficient and to indicate the port or sub-port and port group associated with the strongest coefficient in the CSI report. For example, the port index and/or port group index associated with the strongest coefficient is indicated by the value of a $\log_2(K_1)$ bit indicator or by a $\log_2(K_0)$ bit indicator.

Subband-Based PMI Calculation

In accordance with embodiments, the UE may be configured to report the selected port groups and selected ports in a subband manner for the CSI reporting band. This means the UE may select per subband of the CSI reporting band a precoder matrix associated with the subband.

In an embodiment, the port groups selected by the UE (possibly per polarization) are identical for the subbands of the CSI reporting band, i.e., the selected port group vectors b (without index for simplicity) do not depend on a subband index, and the selected ports associated with the port vectors d as well as the precoder coefficients depend on the subband index.

In an embodiment, the port groups selected by the UE (possibly per polarization) are identical for the subbands of the CSI reporting band, i.e., the selected port group vectors b (without index for simplicity) do not depend on a subband index, and the ports selected by the UE, i.e., the selected port vectors d do not depend on a subband index, and the precoder coefficients depend on the subband index.

In an embodiment, the port groups selected by the UE (possibly per polarization) depend on a subband index, i.e., the selected port group vectors b (without index for simplicity) depend on a subband index, and the selected ports associated with the port vectors d as well as the precoder coefficients depend on the subband index.

The parameters P, Z and D, indicated by the above-mentioned higher layer configuration, may be identical to all subbands, or different for at least two subbands of the CSI reporting band.

In an embodiment, the parameter L or L' may be different for at least two different subbands of the CSI reporting band. For example, the configuration of the parameter L may depend on a subband size.

In an embodiment, the parameter $K_0$ may be different for at least two different subbands of the CSI reporting band. For example, the configuration of the parameter $K_0$ may depend on a subband size.

In case of the selection of an independent selection of port groups for different subbands, the UE is configured to indicate the selected port groups/port selection group vectors for the subbands in the CSI report.

In case of the selection of an independent selection of ports within the port groups for different subbands, the UE is configured to indicate the selected ports for the subbands in the CSI report.

Codebook-Based PMI Reporting

In accordance with embodiments, the PMI reported by the UE is based on a two codebook approach, where the PMI corresponds to two codebook indices $[i_1, i_2]$. The first codebook index $i_1$ contains at least the index $i_{1,1}$ which indicates the selected port groups (or port group vectors). For example, when the selected port-group vectors are indicated by the index $q_1$, $$i_{1,1} \in \left\{0, 1, \ldots, \left\lceil \frac{Z}{2\bar{d}} \right\rceil - 1\right\},$$

or the port-group vectors are indicated by an $$\log_2\binom{Z}{L}$$

combinatorial bit-indicator. In addition, the first codebook index $i_1$ may contain an index $i_{1,7,l}$ corresponding to the bitmap or the combinatorial indicator indicating the selected non-zero coefficients of the l-th transmission layer of the precoder matrix (if configured). In addition, the first codebook index $i_1$ may contain an index $i_{1,8,l}$ corresponding to strongest coefficient indicator of the l-th transmission layer of the precoder matrix. The second codebook index $i_2$ contains at least the index $i_{2,1,l}$ and index $i_{2,2,l}$ which indicate the amplitude $$\left(k_{n,l,d}^{(1)} \text{ and/or } k_{n,l,d}^{(2)}\right)$$

values and phase values of the precoder coefficients (or non-zero precoder coefficients), respectively, for the l-th transmission layer of the precoder matrix.

Precoder Application at gNB

The UE may assume that, for RI, and/or PMI calculation, the network node (gNB) applies the above precoder matrix calculated above, to the PDSCH signals for v layers and antenna ports {3000, . . . , 3000+P−1} as $$\begin{bmatrix} y^{(3000)}(i) \\ \vdots \\ y^{(3000+P-1)}(i) \end{bmatrix} = [P_0, \ldots, P_{v-1}] \begin{bmatrix} x^{(0)}(i) \\ \vdots \\ x^{(v-1)}(i) \end{bmatrix},$$

where $[x^{(0)}(i), \ldots, x^{(v-1)}(i)]^T$ is a symbol vector of PDSCH symbols from the layer mapping defined in reference [10], P is the number antenna ports, $y^{(u)}(i)$ is the precoded symbol transmitted on antenna port u, and $[P_0, \ldots, P_{v-1}]$ is the predicted precoder matrix calculated according to one of the above equations.

Segmented CSI-RS Port Resources

In the embodiments described so far, the inventive approach operated on the basis of the frequency and time domain resources of a CSI-RS port. However, the present invention is not limited to such embodiments, rather, further embodiments may apply a segmentation of the resources of the CSI-RS ports to reduce the channel estimation complexity and signaling overhead for CSI-RS as it shall be described in more detail below.

In other words, a CSI-RS port is segmented into a plurality of sub-ports, and all above-described embodiments equally apply for each of the sub-ports, i.e., when referring in the description of the preceding embodiments to a “port” or a “CSI-RS port” this also refers to a “sub-port” or a “sub-port of the CSI-RS port”. In accordance with the segmented approach, rather than performing the above described processes for the complete port, in accordance with embodiments employing the segmentation, the above described processes are performed per sub-port or for each sub-port considered. A sub-port of a CSI-RS port may refer to a subset of the frequency and time domain resources of the CSI-RS port, wherein the subset of the time and frequency domain resources may either contain all time and frequency domain resources of the CSI-RS port or it may not contain all time and frequency domain resources of the CSI-RS port. Note when the number of sub-ports of a CSI-RS port is 1, the resource subset the sub-port is associated with contains all time and frequency domain resources of the CSI-RS port. When the number of sub-ports of a CSI-RS port is larger than 1, each resource subset the sub-port is associated with contains not all time and frequency domain resources of the CSI-RS port.

When considering non-segmented CSI-RS port resources, the complexity of the channel estimation increases with the number of CSI-RS ports configured to the UE. As a CSI-RS port is associated with a delay and a beam, the number of CSI-RS ports configured to the UE can be very high, when the number of delays required for high performance downlink precoding is large. A large number of CSI-RS ports leads to a high signaling overhead for the CSI-RS configuration and increases the complexity of the channel estimation at the UE.

The following embodiments propose further schemes that reduce the channel estimation complexity and signaling overhead for CSI-RS by multiplexing multiple delays on a single CSI-RS port.

The frequency and/or time domain resources of each antenna or CSI-RS port may be precoded/beamformed at the transmitter. The precoding of CSI-RS may include beamforming and delay operations on the frequency and/or time domain resources of the CSI port. For the beamforming and delay operations, the set of frequency and time domain resources the CSI port is associated with may be segmented into N non-overlapping or overlapping resource subsets in time and/or frequency domain. Each resource subset of the port is independently precoded (i.e., beamformed and possibly delayed) at the transmitter and hence associated with a beam and delay. Note that the beamforming operation can be identical for all resource subsets of a port. In such a case, all resources of the port are associated with the same beamforming operation (i.e., the same beam). Further note that a delay operation in the frequency domain is performed by multiplying each frequency domain and/or time domain resource of the resource subset with a phase term, where the phase linearly increases or decreases with respect to the frequency domain and/or time domain resource indices. Hence, the phase terms may be defined by the entries of a Fourier vector. Note that the slope of the phase increase or decrease defines the value of the delay.

Each subset of the time and frequency domain resources of the CSI-RS port may be associated with a specific beamforming and delay operation at the transmitter. The specific beamforming and delay operation applied on the resources associated with a sub-port or a CSI-RS port at the transmitter may be transparent to the UE. This means, the transmitter is not explicitly signaling the specific beamforming and delay operations performed on the resources of the sub-ports or CSI-RS ports to the UE.

In accordance with embodiments, the set of frequency and time domain resources of a CSI port may be segmented into N non-overlapping or overlapping resource subsets in time and/or frequency domain. Each resource subset may be associated with a sub-port of the CSI-RS port. A CSI-RS port may comprise one or more sub-ports. In one method, the locations of the frequency and time domain resources of a sub-port associated with a CSI-RS port are configured via a higher layer configuration to the UE. In another method, the locations are known to the UE (e.g., the locations are fixed or pre-defined by a rule defined in the specification).

Figure 9:
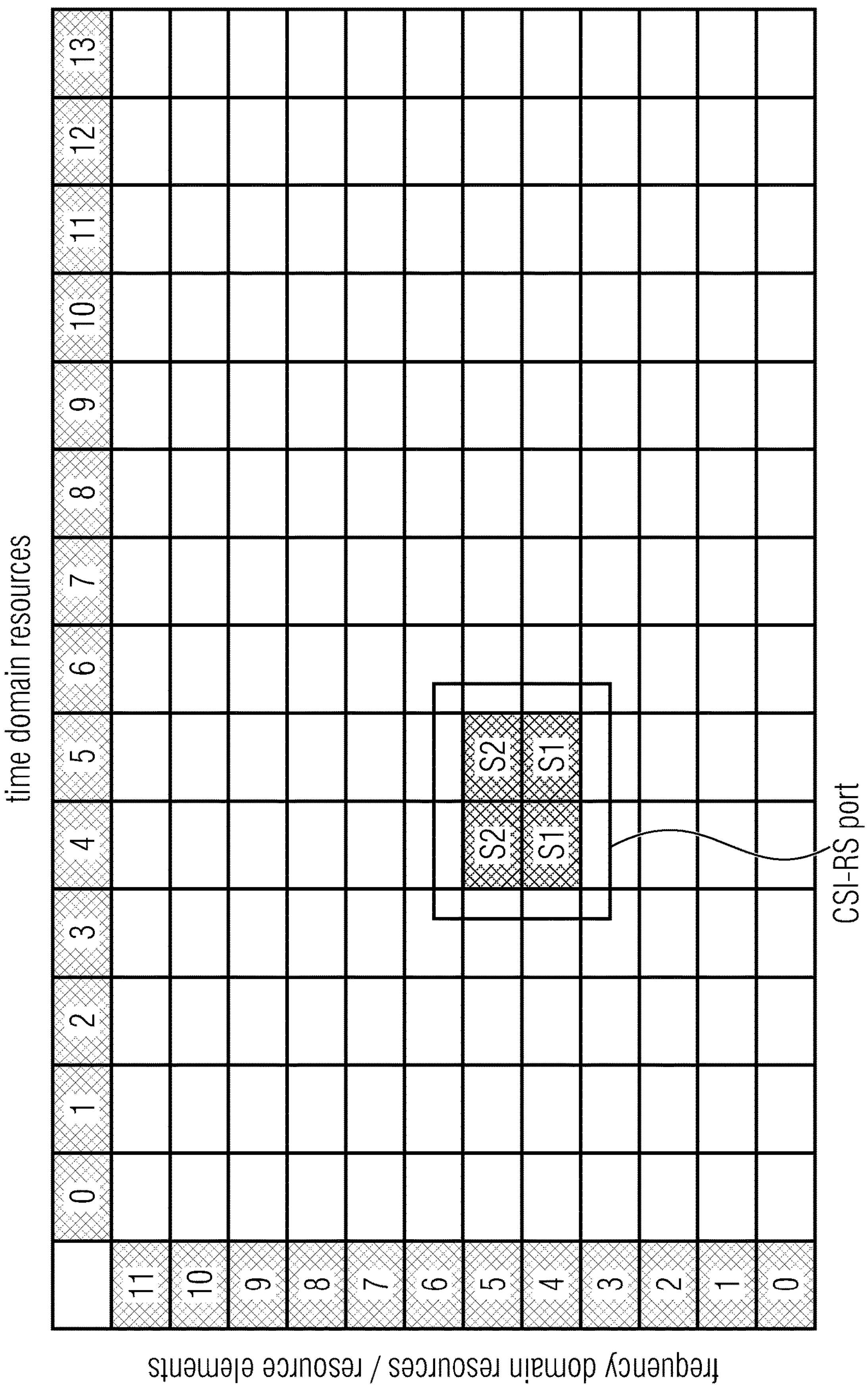
FIG. 9 illustrates an embodiment of segmenting the resources of a CSI-RS port of an 8-port CSI-RS resource into two sub-ports.

In one method, each resource subset associated with a sub-port comprises a subset of the frequency domain resources for all time domain resources of the CSI-RS port. An embodiment of segmenting the resources of a CSI-RS port of an 8-port CSI-RS resource into two sub-ports S1, S2 is shown in FIG. 9. FIG. 9 shows the resource elements per PRB of one CSI-RS port and the segmentation of the 4 resource elements per PRB into the two sub-ports S1, S2. The configuration may be according to TS 38.211-Table 7.4.1.5.3-1:8-port CSI-RS resource, CDM4 (FD2,TD2).

Figure 10:
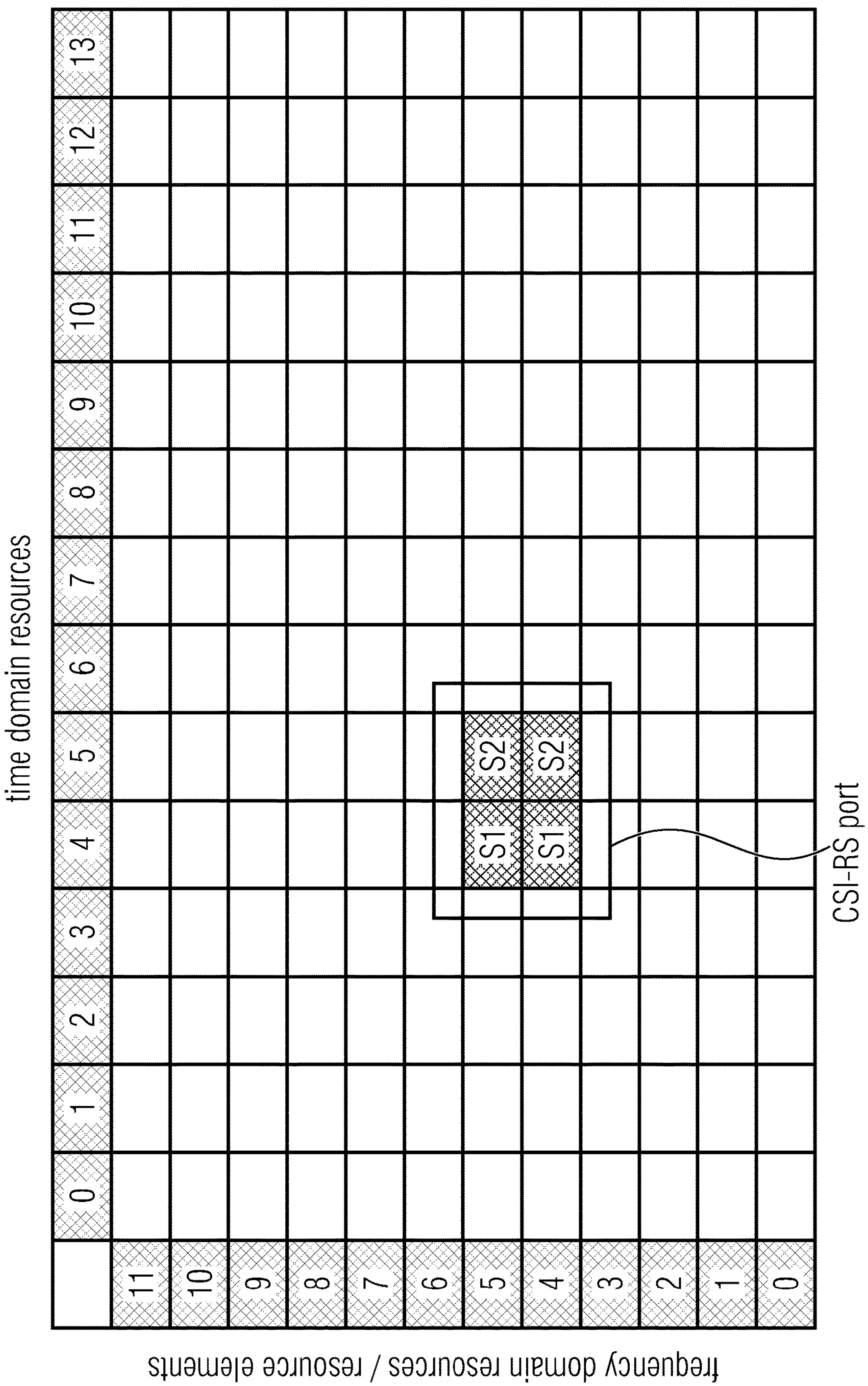
FIG. 10 illustrates another embodiment of segmenting the resources of a CSI-RS port of an 8-port CSI-RS resource into two sub-ports.

In one method, each resource subset associated with a sub-port comprises a subset of the frequency domain resources per time domain resource of the CSI-RS port. An embodiment of segmenting the resources of a CSI-RS port of an 8-port CSI-RS resource into two sub-ports is shown in FIG. 10. FIG. 10 shows the resource elements per PRB of one CSI-RS port and the segmentation of the 4 resource elements per PRB into the two sub-ports S1, S2. The configuration may be according to TS 38.211-Table 7.4.1.5.3-1:8-port CSI-RS resource, CDM4 (FD2,TD2).

Figure 11:
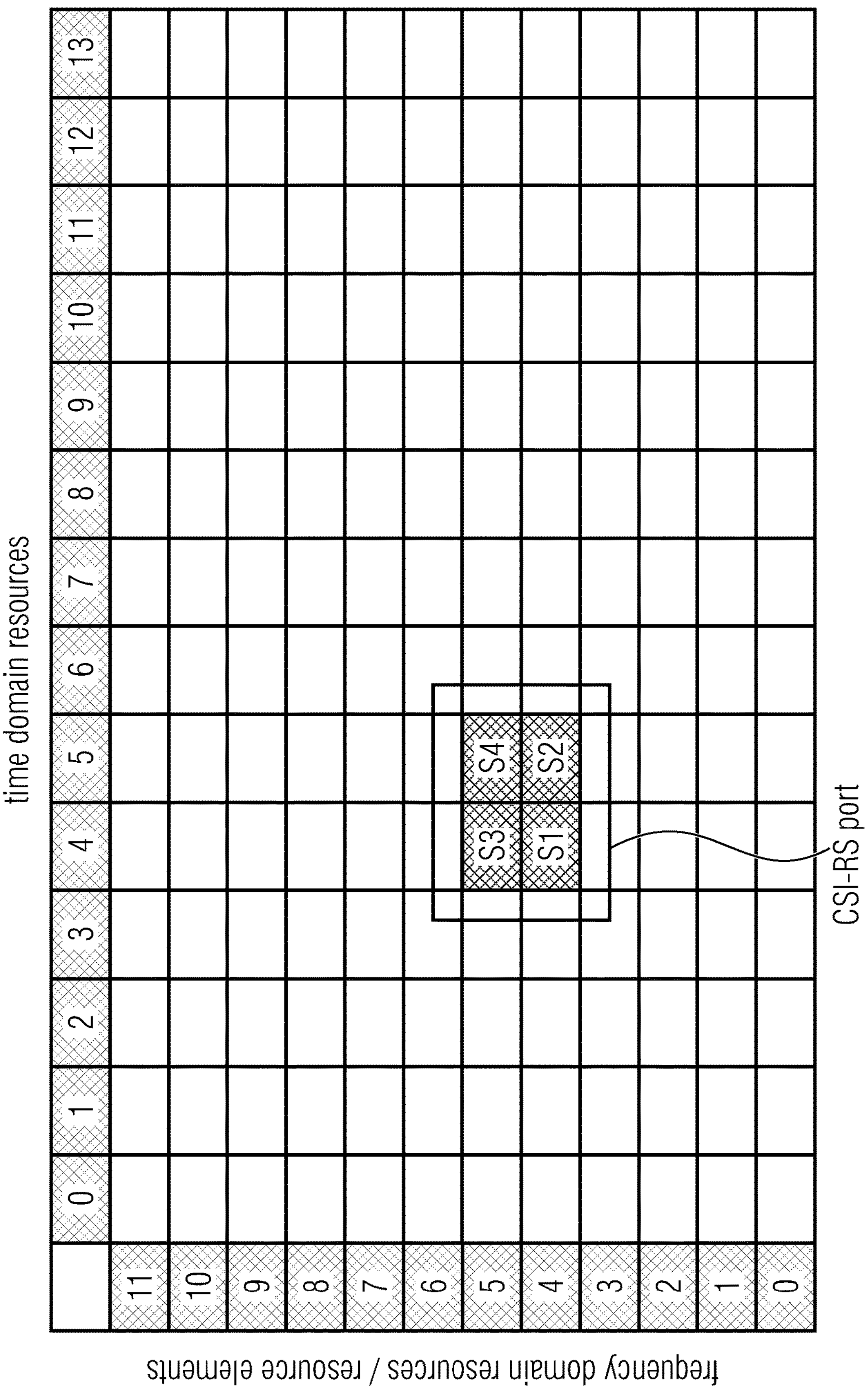
FIG. 11 illustrates yet another embodiment of segmenting the resources of a CSI-RS port of an 8-port CSI-RS resource into four sub-ports.

In one method, each resource subset associated with a sub-port comprises a subset of the frequency domain and time domain resources of a CSI-RS port. For example, one sub-port is associated with one resource element per PRB of the CSI-RS port. An embodiment of segmenting the resources of a CSI-RS port of an 8-port CSI-RS resource into four sub-ports is shown in FIG. 11. FIG. 11 shows the resource elements per PRB of one CSI-RS port and the segmentation of the 4 resource elements per PRB into four sub-ports S1, S2, S3, S4. The configuration may be according to TS 38.211-Table 7.4.1.5.3-1:8-port CSI-RS resource, CDM4 (FD2,TD2).

In accordance with embodiments, the UE is configured with P CSI-RS ports (via a higher layer) and $\hat{P}$ sub-ports. The $\hat{P}$ sub-ports are associated with the P CSI-RS ports, wherein $\hat{P} \geq P$ or $\hat{P} > P$.

In one method, the P CSI-RS ports configured to the UE are grouped into two groups of P/2 CSI-RS ports, wherein the first group is associated with CSI-RS ports of a first polarization and the second group is associated with CSI-RS ports of a second polarization. The number of sub-ports, $\hat{P}_1$, associated with the CSI-RS ports of the first polarization may be identical with the number of sub-ports, $\hat{P}_2$, associated with the CSI-RS ports of the second polarization, i.e, $\hat{P}=\hat{P}_1=\hat{P}_2$.

In one method, the number of sub-ports, $N_p$, for the p-th CSI-RS port and p+P/2-th CSI-RS port (for the two polarizations of the CSI-RS ports) may be identical. Then, $N_p=N_{p+P/2}$.

In one method, the number of sub-ports, $\hat{P}$, for the P CSI-RS ports may be indicated to the UE via a higher layer (e.g., RRC or MAC-CE) or via a lower layer (e.g., the physical layer).

In one method, the number of sub-ports is indicated per CSI-RS port to the UE via a higher layer (e.g., RRC or MAC-CE) or via a lower layer (e.g., the physical layer).

In one method, the number of sub-ports is known at the UE and may depend on the number of configured CSI-RS ports, i.e., $\hat{P}$=func(P).

In one method, the number of sub-ports of the CSI-RS ports for each polarization may be indicated to the UE via a higher layer (e.g., RRC or MAC-CE) or via a lower layer (e.g., the physical layer).

In one method, the number of sub-ports, $\hat{P}$, are known by the UE and may depend on the number of configured CSI-RS ports, i.e., $\hat{P}$=func(P), wherein the relation of P and $\hat{P}$ is fixed in specification.

In one method, the number of sub-ports, $N_p$, per CSI-port is identical for all CSI-RS ports of the configured P-port CSI-RS resource, i.e., $N_p=N_{p'}$, ∀p, p' wherein p and p' indicate the port indices of the configured P CSI-RS ports.

In one method, the number of sub-ports, $N_p$, for each CSI-RS port of the P-port CSI-RS resource is configured via a higher or a lower layer, or it is fixed and known in specification.

In one method, the number of sub-ports per CSI-RS port is fixed for a first set of CSI-RS ports and configurable via a higher layer for a second set of CSI-RS ports.

In one method, the number of sub-ports, $N_p$, depends on the number of code division multiplexing, CDM, groups, or the number of ports per CDM group for the configured P CSI-RS port CSI-RS resource.

In one method, the number of sub-ports depends on the number of resource elements in frequency and/or time domain in each CDM group of the configured P CSI-RS port CSI-RS resource. For example, the number of sub-ports $N_p$ per CSI-RS port is defined by $N_s=\alpha P/T$, where P is the number of configured CSI-RS ports, T is the number of CDM groups and $\alpha$ is factor. In one example, $\alpha=1$. In another example, $\alpha=1/2$ or $\alpha=1/4$. The parameter a may be either known by the UE and fixed in specification, or it is configured via higher layer or a lower layer.

In one method, the number of sub-ports, $N_p$, is a function of the number of CSI-RS ports and CDM groups configured for the P CSI-RS port CSI-RS resource.

It is noted that some or all of the above-mentioned methods may also be used together or in combination.

Precoder Matrix

The precoder matrix may be defined as a complex combination of vectors selected from one or more codebook matrices. Note that each column of the precoder matrix defines the precoding vector for a layer. Each vector selected from the one or more codebook matrices may include or consist of zero-valued elements, except a single element which is one. The vectors of the one or more codebook matrices are orthogonal to each other such that the codebook (s) is/are defined by subset(s) of an identity matrix.

Each entry of a vector from the one or more codebooks is associated with a subset of the time and/or frequency domain resources (i.e. a sub-port) of a CSI-RS port. This means the sub-port index may hence be associated with an element-index of the vector. For at least one vector from the one or more codebooks, the associated subset does not contain all time and frequency domain resources of the CSI-RS port. The size of the vectors from the one or more codebooks may indicate the total number of sub-ports used at the transmitter for precoding independently a number of resource subsets of the CSI-RS ports.

In one method, each vector from the one or more codebooks has a size of $\hat{P}\times 1$ and is associated with the $\hat{P}$ sub-ports of the P CSI-RS ports.

In another method, each vector has a size of $\hat{P}\times 1$ and is associated with P/2 CSI-RS ports of one polarization.

In accordance with embodiments, the UE is configured to select L vectors from the one or more codebooks, wherein $L<\hat{P}$ or $L\leq\hat{P}$, and to indicate the selected L vectors in the CSI report. The linear combination of the selected L vectors using a set of L complex coefficients defines the precoding matrix or precoding vector of a transmission layer.

In accordance with embodiments, the UE is configured to select a set of precoder coefficients for the selected vectors, wherein each selected vector is associated with a complex precoder coefficient. Note that each vector is associated with a selected CSI-RS port and/or a sub-port of a CSI-RS port. Therefore, a CSI-RS port can either be associated with a single coefficient when the port is associated with one delay operation at the transmitter, or with multiple coefficients when the port is associated with multiple delay operations at the transmitter. The UE is configured to indicate the selected coefficients in the CSI report.

In one method, each vector selected from the one or more codebooks is associated with P CSI-RS ports. In another method, each vector selected from the one or more codebooks is associated with the CSI-RS ports (i.e., with P/2 CSI-RS ports) of one polarization. In one instance of this method, the UE selects independently L vectors per polarization of the CSI-RS ports. In another instance of this method, the UE selects L vectors and the same L vectors are applied for both polarizations of the precoding matrix (and hence CSI-RS ports). The UE is configured to indicate the selected vectors in the CSI report.

In accordance with embodiments, each vector of the complex combination of vectors used in the precoding matrix is a combination (e.g., defined by a Kronecker product) of two vectors, wherein the first vector is selected from a first codebook and the second vector is selected from a second codebook.

The $\hat{P}$ sub-ports may be grouped into Z port groups, wherein each port group comprises M sub-ports. Note that a sub-port may also correspond to a CSI-RS port when the number of sub-ports that are associated with a CSI-RS port is one. In such a case, all time and/or frequency domain resources of the CSI-RS port are associated with the same delay operation at the transmitter.

The Z ports groups may be associated with Z vectors that are comprised in a first codebook matrix, wherein the z-th (z=0, . . . , Z−1) vector of size Z×1 includes or comprises zero-valued elements, except the z-th element which is one. Each entry of a vector from the first codebook matrix may be associated with a port group. As each vector comprises only a single one, each vector is also associated with a port group. For some examples, the number of port groups, Z, is given by the number of CSI-RS ports such that Z=P, or by the number of CSI-RS ports per polarization such that Z=P/2.

Each port group may be associated with M sub-ports, such that $M\cdot Z=\hat{P}$. The M sub-ports may be associated with M vectors that are comprised in a second codebook matrix, wherein the m-th (m=0, . . . , M−1) vector of size M×1 includes or comprises zero-valued elements, except the m-th element which is one.

The UE may be configured to select L vectors (i.e., port groups) from the first codebook, wherein L<Z or L≤Z, and M or up to M vectors (per port group) from the second codebook and to indicate the selected vectors from the two codebooks in the CSI report.

The parameter Z indicating the ports or sub-ports per port group may be configured to the UE from a network node, or it is known to the UE, i.e., it is fixed in specification.

Embodiments of the Precoder Matrix.

EMBODIMENT 1

In accordance with embodiments, the precoder matrix may be expressed by a one or more vectors or by a combination of vectors selected from the port-selection codebooks, and the precoder matrix $P_n$ (e.g., for a single polarization of the CSI-RS ports) for the n-th transmission layer for the P ports and configured subbands or resource blocks is given by $$P_n = \alpha_n \sum_{l=0}^{L-1} b_{n,l} p_{n,l},$$

where $\alpha_n$ is a normalization constant, $b_{n,l}$ is a P×1 vector selected from one or more codebook and associated with the l-th selected sub-port, and $P_{n,l}$ is the precoder coefficient associated with the l-th selected sub-port.

EMBODIMENT 2

In accordance with embodiments, the precoder matrix may be expressed by one or more vectors or by a combination of vectors selected from one or more port-selection codebooks, and the precoder matrix $P_n$, for the n-th transmission layer for the two polarizations of the P ports and configured subbands or resource blocks is given by $$P_n = \alpha_n \begin{pmatrix} \sum_{l=0}^{L-1} (b_{n,l,1} p_{n,l,1}) \\ \sum_{l=0}^{L-1} (b_{n,l,2} p_{n,l,2}) \end{pmatrix}$$

where $\alpha_n$ is a normalization constant, $b_{n,l,1}$ is a $\hat{P}\times 1$ vector and associated with the first polarization and the l-th selected sub-port, $b_{n,l,2}$ is a $\hat{P}\times 1$ vector and associated with the second polarization and the l-th selected sub-port, $p_{n,l,1}$ is the precoder coefficient associated with the first polarization and the l-th selected sub-port, and $p_{n,l,2}$ is the precoder coefficient associated with the second polarization and the l-th selected sub-port.

In the above equations of the precoder matrix, the port group vector bnl depends on the transmission layer. In case of an identical port selection for all transmission layers, $b_{n,l}=b_l$, $\forall$n.

In the above equations of the precoder matrix, the port group vector $b_{n,l,p}$ depends on the polarization index p. In case of an identical port selection for the both polarizations, $b_{n,l,p}=b_{n,l}$, $\forall$p. In case of an identical port selection for the both polarizations and all transmission layers, $b_{n,l,p}=b_l$, $\forall$n, p.

EMBODIMENT 3

In accordance with embodiments, the precoder matrix may be expressed by one or more vectors or by a combination of vectors selected from two port-selection codebooks, and the precoder matrix $P_n$ for the n-th transmission layer for the two polarizations of the P ports and configured subbands or resource blocks is given by $$P_n = \alpha_n \begin{Bmatrix} \sum_{l=0}^{L-1}\left(b_{n,l,p} \otimes \sum_{d=0}^{D-1} d_{n,l,d,1} p_{n,l,d,1}\right) \\ \sum_{l=0}^{L-1}\left(b_{n,l,p} \otimes \sum_{d=0}^{D-1} d_{n,l,d,2} p_{n,l,d,2}\right) \end{Bmatrix}$$

where

- $b_{n,l,1}$ is a vector of a first polarization of the CSI-RS ports and selected from the first codebook and associated with the l-th selected port group,
- $b_{n,l,2}$ is a vector of a second polarization of the CSI-RS ports and selected from the first codebook and associated with the l-th selected port group,
- $d_{n,l,d,1}$ is a vector selected from the second codebook and associated with the first polarization, the l-th selected port group and the d-th selected sub-port,
- $d_{n,l,d,2}$ is a vector selected from the second codebook and associated with the second polarization, the l-th selected port group and the d-th selected sub-port,
- $p_{n,l,d,1}$ is the precoder coefficient associated with the d-th selected sub-port of the l-th selected port group of the first polarization, and
- $p_{n,l,d,2}$ is the precoder coefficient associated with the d-th selected sub-port of the l-th selected port group of the second polarization.

In the above equations of the precoder matrix, the port group vector bnl depends on the transmission layer. As mentioned above, in case of identical port grouping for all transmission layers, $b_{n,l}=b_l$, $\forall$n.

In the above equations of the precoder matrix, the port group vector $b_{n,l,p}$ depends on the polarization index p. In case of an identical port selection for the both polarizations, $b_{n,l,p}=b_{n,l}$, $\forall$p. In case of an identical port selection for the both polarizations and all transmission layers, $b_{n,l,p}=b_l$, $\forall$n, p.

EMBODIMENT 4

In accordance with embodiments, the precoding vector or matrix for each transmission layer is defined for a number of subbands, $N_3$, or PRBs or frequency domain units/components used for PMI reporting and based on one or more vectors or one or more combinations of vectors selected from a port-selection codebook and a delay codebook comprising D vectors and a set of precoding coefficients, wherein each vector from the port-selection codebook is associated with one of the antenna ports or one of the sub-ports, and each vector from the delay codebook is associated with a delay or delay index of the precoder and represented by a DFT-based vector for the $N_3$ subbands of the precoder vector or matrix.

In accordance with embodiments, the delay codebook comprises D DFT-based vectors for the $N_3$ subbands, wherein each vector is of size $N_3 \times 1$ and associated with a delay index. In one option, $D=N_3$ such that the delay codebook is defined by a $N_3 \times N_3$ DFT-based matrix $[a_0, a_1, \ldots a_{N_3-1}]$, wherein the vector $a_i$ of size $N_3 \times 1$ is associated with delay or delay index "i". In another option, $D<N_3$ and the delay codebook comprises the first D DFT-based vectors $(a_0, \ldots, a_{D-1})$. In another option, the D vectors of the delay codebook are associated with the indices $a_i$, $\forall i=0, \ldots, D-1$ from the delay codebook containing $N_3$ DFT-based vectors, where $a_i=\mathrm{mod}(a_s+i, N_3)$, $\forall i=0, \ldots, D-1$, and wherein as is the starting index of the vector from the delay codebook containing $N_3$ DFT-based vectors. The delay codebook then comprises the D vectors $(a_{mod(a_s+0,N_3)}, \ldots, a_{mod(a_s+D-1,N_3)})$. In another option, the D DFT-based vectors are associated with the indices $a_{i_n}$, $\forall i_n=0, \ldots, D_n-1$, $\forall n=0 \ldots N-1$ from the delay codebook containing $N_3$ DFT-based vectors, where $a_{i_n}=\mathrm{mod}(a_{s_n}+i_n, N_3)$, $\forall i_n=0, \ldots, D_n-1$, and wherein $a_{s_n}$ is the starting index of the vector from the delay codebook containing $N_3$ vectors for parameter n, and wherein $$\sum_{n=0}^{N-1} D_n = D$$

and $a_s \neq a_{s_n}$, $\forall$n. The delay codebook comprises the $D_n$ vectors $$\left(a_{mod(a_{s_n}+0,N_3)}, \ldots, a_{mod(a_{s_n}+D_n-1,N_3)}\right).$$

In some examples, $a_s$ or $a_{s_n}$, $\forall$n and/or N is configured to the UE from the network node. Here, mod(a, b) denotes the modulo function of a modulo b.

In accordance with embodiments, the parameter D or parameters $D_n$ representing the number of DFT-based vectors of the delay codebook is/are configured to the UE from the network node, or fixed in the NR specification and hence known by the UE.

In accordance with embodiments, the precoding vector for a transmission layer is based on L vectors selected from the port-selection codebook and D or less than D vectors selected from the delay codebook. The UE is configured to indicate the vectors selected from the port-selection codebook and from the delay codebook in the CSI report. The precoding vector or matrix $W^n$ for the n-th transmission layer may be defined by $$W^n = W_{1,n} W_{2,n} W_{f,n}^H, \text{ or}$$

$$W^n = \sum_{l=0}^{L-1} \sum_{d=0}^{D-1} p_{n,l,d}\left(d_{n,l} a_{n,l,d}^H\right) = \sum_{d=0}^{D-1} \sum_{l=0}^{L-1} p_{n,l,d}\left(d_{n,l} a_{n,l,d}^H\right),$$

$$W^n = \sum_{l=0}^{L-1} \sum_{d=0}^{D-1} p_{n,l,d,t}\left(d_{n,l} a_{n,l,d}^H\right) = \sum_{d=0}^{D-1} \sum_{l=0}^{L-1} p_{n,l,d,t}\left(d_{n,l} a_{n,l,d}^H\right), \text{ or}$$

-continued $$W^n = \begin{bmatrix} \sum_{l=0}^{L-1} \sum_{d=0}^{D-1} p_{n,l,d}\left(d_{n,l} a_{n,l,d}^H\right) \\ \sum_{l=0}^{L-1} \sum_{d=0}^{D-1} p_{n,l+L,d}\left(d_{n,l+L} a_{n,l+L,d}^H\right) \end{bmatrix},$$

where $W_{1,n}$ is a matrix comprising L selected vectors from the port-selection codebook, $W_{2,n}$ is a coefficient matrix, $$W_{f,n}^H$$

$d_{n,l}$ is a P×1 vector or P/2×1 vector selected from the port-selection codebook, $a_{n,l,d}$ is a $N_3$×1 vector selected from the delay codebook, $p_{n,l,d}$ is a complex precoder coefficient or combining coefficient, and $p_{n,l,d}$ is a complex precoder coefficient or combining coefficient for the t-th polarization (t=1,2).

Special Case of Port Grouping P=Z

In accordance with an embodiment, the number of ports or sub-ports may be identical to the number of port groups, such that P=Z or $\hat{P}$=Z. The number of CSI-RS ports or CSI-RS sub-ports per port group is hence 1. The UE is configured to select and report a number of ports equal to L or less than L out of a total of P (or P) ports (or sub-ports) to the network node. The parameter L is either known by the UE and fixed in specification, or configured to the UE by the network node via a higher layer (e.g., via RRC or MAC-CE), or via a physical layer (e.g., DCI).

In one method, the sub-ports, ports or port groups are selected per transmission layer of the precoder matrix, and may change or not with respect to the transmission layer index.

In another method, the selected sub-ports, ports or port groups are identical for all transmission layers of the precoder matrix.

In another method, the selected sub-ports, ports or port groups are identical for a subset of the transmission layers of the precoder matrix. Here, the term 'subset' may mean a number of layers less than the supported total number of layers. For example, a number of sub-ports, ports or port groups is selected for a first layer and for a second layer, and configured to be identical, and a number of sub-ports, ports or port groups is selected for a third layer and for a fourth layer, and configured to be identical.

In one method, the parameter L may be dependent on the transmission layer. This means the UE may be configured to apply different values of L for different transmission layers of the precoder matrix. In another method, the parameter L may be independent on the transmission layer and a single value L may be configured for all layers.

In accordance with an embodiment, the UE is configured to include an information on the selected port groups, ports and/or sub-ports in the CSI report. In one embodiment, the UE may indicate the selected L sub-ports, ports or port groups by a P- or $\hat{P}$-length bit-sequence, where L denotes the number of sub-ports, ports or port groups over the two polarizations of the P CSI-RS ports. Each bit in the bit-sequence is associated with one of the P ports or $\hat{P}$ sub-ports. A bit indicating a '1' in the bit-sequence may indicate that the associated port or sub-port is selected and a '0' may indicate that the associated port or port group is not selected. In one embodiment, the UE may indicate each selected port or sub-port by a $\lceil \log_2(P) \rceil$ or $\lceil \log_2(\hat{P}) \rceil$ bit indicator. Alternatively, the UE may indicate the selected L ports or sub-ports by a $$\left\lceil \log_2\binom{P}{L} \right\rceil \text{ or } \left\lceil \log_2\binom{P/2}{L} \right\rceil \text{ or } \left\lceil \log_2\binom{\hat{P}}{L} \right\rceil$$

combinatorial bit-indicator. When the selected ports or sub-ports are indicated per layer (or subset of layers) then the UE may report a bitmap, or a combinatorial bit indicator as mentioned above per layer (or subset of layers).

Normalization and Quantization of Precoder Coefficients Separately for Each Layer:

In accordance with embodiments, the UE is configured to decompose and report the selected complex precoder coefficients $\{p_{n,l,d}\}$ (or $\{p_{n,l,d,t}\}$ (t∈{1,2})) per layer separately as $$p_{n,l,d} = a_{n,l,d}^{(1)} a_{n,l,d}^{(2)} a_{n,l,d}^{(3)} \varphi_{n,l,d},$$

$$\left(p_{n,l,d,t} = a_{n,l,d,t}^{(1)} a_{n,l,d,t}^{(2)} a_{n,l,d,t}^{(3)} \varphi_{n,l,d,t}\right)$$

where $a_{n,l,d}^{(1)}\left(a_{n,l,d,t}^{(1)}\right)$ is a first amplitude coefficient, $a_{n,l,d}^{(2)}\left(a_{n,l,d,t}^{(2)}\right)$ is a second amplitude coefficient, $a_{n,l,d}^{(3)}\left(a_{n,l,d,t}^{(3)}\right)$ is a third amplitude coefficient, $\varphi_{n,l,d}(\varphi_{n,l,d,t})$ is a phase coefficient.

In one option, n may be the layer index, l is the port-group index, d is the port or sub-port index, and t∈{1,2} is an index indicating the polarization of the coefficient.

In another option, n may be the layer index, l is port index or sub-port index, d is the delay index, and t∈{1,2} is an index indicating the polarization of the coefficient.

In one option, the CSI report may contain for each selected precoder coefficient a quantized value of the first amplitude coefficient, possibly a quantized value of the second amplitude coefficient, possibly a quantized value of the third amplitude coefficient, and a quantized value of the phase coefficient per layer.

In one option, the CSI report may contain for each selected precoder coefficient a quantized value of the amplitude coefficient and a quantized value of the phase coefficient.

In one option, the CSI report may contain for each selected precoder coefficient a quantized value of the first amplitude coefficient, a quantized value of the second amplitude coefficient and a quantized value of the phase coefficient.

In one option, the CSI report may contain for each selected precoder coefficient a quantized value of the first amplitude coefficient, a quantized value of the second amplitude coefficient, a quantized value of the third amplitude coefficient and a quantized value of the phase coefficient.

In accordance with embodiments, the UE may be configured to normalize the complex precoder coefficients per layer such that the maximum amplitude and phase of the strongest coefficient per layer equals to '1' and '0', respectively.

Phase Quantization:

In accordance with embodiments, the phase coefficients may be selected either from a QPSK, 8PSK, 16PSK, 32PSK or 64PSK alphabet and configured by the value $N_{PSK}$ (alphabet size). In one embodiment, the single value of $N_{PSK}$ is configured with the higher layer parameter PhaseAlphabetSize. In another embodiment, the value of $N_{PSK}$ is fixed, for example to $N_{PSK}=8$ or $N_{PSK}=16$. In another embodiment, two values of $N_{PSK}$ are configured by the higher layer parameter PhaseAlphabetSize, wherein one value of $N_{PSK}$ is used to quantize the phase values of a first set of coefficients and a second value of $N_{PSK}$ is used to quantize the phase values of a second set of coefficients, and wherein the first value of $N_{PSK}$ is greater than the second value of $N_{PSK}$. In one method, the first value of $N_{PSK}$ may be configured and the second value of $N_{PSK}$ may be derived from the first value of $N_{PSK}$, such that the second value of $N_{PSK}$ is less than the first value of $N_{PSK}$.

In accordance with embodiments, the coefficients are segmented into at least two sets and the phases of the coefficients of each set are differently quantized.

In one method, the first set contains all non-zero coefficients and the second set contains all zero coefficients.

In one method, the first set contains a fraction of the non-zero coefficients and the second set contains the remaining fraction of the non-zero coefficients.

In one method, the first set contains all coefficients (or non-zero coefficients) associated with the CSI-RS ports or sub-ports of the strongest polarization, and the second set contains all coefficients (or non-zero coefficients) associated with the CSI-RS ports or sub-ports of the weakest polarization.

In one method, the first set contains all coefficients (or non-zero coefficients) associated with one or more CSI-RS ports or sub-ports associated with the first codebook, and the second set contains all coefficients (or non-zero coefficients) associated with the remaining CSI-RS ports or sub-ports of the first codebook that are not contained in the first set.

In one method, the first set contains all coefficients (or non-zero coefficients) associated with one or more CSI-RS ports or sub-ports associated with the second codebook, and the second set contains all coefficients (or non-zero coefficients) associated with the remaining CSI-RS ports or sub-ports of the second codebook that are not contained in the first set.

In one method, the first set contains all coefficients (or non-zero coefficients) associated with one or more CSI-RS ports or sub-ports associated with the first codebook and one or more CSI-RS ports or sub-ports associated with the second codebook, and the second set contains all coefficients (or non-zero coefficients) associated with the remaining CSI-RS ports or sub-ports of the first codebook and remaining CSI-RS ports or sub-ports of the second codebook that are not contained in the first set.

In one method, the first set contains all coefficients (or non-zero coefficients) associated with one or more transmission layers and the second set contains all coefficients (or non-zero coefficients) associated with the remaining layers that are not contained in the first set.

In accordance with embodiments, the set of coefficients associated with the strongest polarization may comprise the strongest coefficient having an amplitude and phase of '1' and '0', respectively. The set of coefficients associated with the weakest polarization may not comprise the strongest coefficient having an amplitude and phase of '1' and '0', respectively.

In accordance with embodiments, the phase coefficients may be reported per complex precoder coefficient $p_{n,l,d}$ (or $\{P_{n,l,d,t}\}$ ($t\in\{1,2\}$)) except for the strongest coefficient whose amplitude $$a_{n,l,d}^{(3)}\left(a_{n,l,d,t}^{(3)}\right)$$

and phase $\varphi_{n,l,d}$ ($\varphi_{n,l,d,t}$) is equal to one and zero, respectively.

Amplitude Quantization Scheme 1—Common (l, d):

In an embodiment, the first amplitude coefficients $$a_{n,l,d}^{(1)}$$

and the second amplitude coefficients $$a_{n,l,d}^{(2)}$$

are common for all (l, d). In this case, $$a_{n,l,d}^{(1)} = 1 \text{ and } a_{n,l,d}^{(2)} = 1$$

are fixed and not reported. In one embodiment, an amplitude coefficient $$a_{n,l,d}^{(3)}$$

is reported per precoder coefficient. In another embodiment, an amplitude coefficient $$a_{n,l,d}^{(3)}$$

is reported per precoder coefficient except for the precoder coefficient whose amplitude and phase are equal to '1' and '0', respectively.

Amplitude Quantization Scheme 2—Specific l, Common d:

In another embodiment, the amplitude coefficients $$a_{n,l,d}^{(2)}$$

are common for all indices d i.e., $$a_{n,l,d}^{(2)} = a_{n,l}^{(2)},$$

and one amplitude coefficient $$a_{n,l,d}^{(2)}$$

is reported per index l (l=0, . . . , L−1) except for the strongest coefficient $$a_{n,l,d}^{(2)}$$

whose amplitude is equal to one is not reported) and one amplitude coefficient $$a_{n,l,d}^{(3)}$$

is reported per precoder coefficient (possibly except for the strongest coefficient $$a_{n,l,d}^{(3)}$$

whose amplitude and phase are equal to '1' and '0', respectively, is not reported). In this case, L−1 amplitude coefficients $$a_{n,l,d}^{(2)}$$

are reported.

In some examples, $$a_{n,l}^{(2)} = a_l^{(2)},$$

and only L−1 values are reported to the UE for all transmission layers instead of L−1 values for each layer.

Amplitude Quantization Scheme 3—Common l, Specific d:

In further embodiment, the amplitude coefficients $$a_{n,l,d}^{(2)}$$

are common for all indices l i.e., $$a_{n,l,d}^{(2)} = a_{n,d}^{(2)}$$

and one amplitude coefficient $$a_{n,l,d}^{(2)}$$

is reported per index d (d=0, . . . , D−1) (except for the strongest coefficient $$a_{n,l,d}^{(2)}$$

whose amplitude is equal to one is not reported) and one amplitude coefficient $$a_{n,l,d}^{(3)}$$

is reported per precoder coefficient (possibly except for the strongest coefficient $$a_{n,l,d}^{(3)}$$

whose amplitude and phase are equal to '1' and '0', respectively, is not reported). In this case, D−1 amplitude coefficients $$a_{n,l,d}^{(2)}$$

are reported.

In some examples, $$a_{n,d}^{(2)} = a_d^{(2)},$$

and only D−1 values are reported to the UE for all transmission layers instead of D−1 values for each layer.

Amplitude Quantization Scheme 4—Common l, Common t, Common d:

In an embodiment, the first amplitude coefficients $$a_{n,l,d,t}^{(1)}$$

and the second amplitude coefficients $$a_{n,l,d,t}^{(2)}$$

are common for all (l, d) for each layer. In this case, $$a_{n,l,d,t}^{(1)} = 1 \text{ and } a_{n,l,d,t}^{(2)} = 1$$

are fixed (i.e., they are not present) and not reported. In one embodiment, an amplitude coefficient $$a_{n,l,d,t}^{(3)}$$

is reported per precoder coefficient. In another embodiment, an amplitude coefficient $$a_{n,l,d,t}^{(3)}$$

is reported per precoder coefficient except for the precoder coefficient whose amplitude and phase are equal to '1' and '0', respectively.

Amplitude Quantization Scheme 5—Specific l, Specific t, Common d:

In an embodiment, the first amplitude coefficients $$a_{n,l,d,t}^{(1)}$$

are common for all (l, d, t). In this case, $$a_{n,l,d,t}^{(1)}=1$$

is fixed and not reported (i.e., they are not present). In one embodiment, the amplitude coefficients $$a_{n,l,d,t}^{(2)}$$

are common for all indices d i.e., $$a_{n,l,d,t}^{(2)}=a_{n,l,t}^{(2)}$$

for each layer and one amplitude coefficient $$a_{n,l,d,t}^{(2)}$$

is reported per index l (l=0, . . . , L−1) and per index t (t∈{1,2}) (except for the strongest coefficient $$a_{n,l,d,t}^{(2)}$$

whose amplitude is equal to one is not reported) and one amplitude coefficient $$a_{n,l,d,t}^{(3)}$$

is reported per precoder coefficient (possibly except for the strongest coefficient $$a_{n,l,d,t}^{(3)}$$

whose amplitude and phase are equal to '1' and '0', respectively, is not reported). In this case (2L−1) amplitude coefficients $$a_{n,l,d,t}^{(2)}$$

are reported for each transmission layer.

In some examples, $$a_{n,l,t}^{(2)}=a_{l,t}^{(2)},$$

and only 2L−1 values are reported to the UE for all transmission layers instead of 2L−1 values for each layer.

Amplitude Quantization Scheme 6—Specific l, Common t, Common d:

In another embodiment, the amplitude coefficients $$a_{n,l,d,t}^{(2)}$$

are common for all indices d and t i.e, $$a_{n,l,d,t}^{(2)}=a_{n,l}^{(2)},$$

and one amplitude coefficient $$a_{n,l,d,t}^{(2)}$$

is reported per index l (l=0, . . . , L−1) (except for the strongest coefficient $$a_{n,l,d,t}^{(2)}$$

whose amplitude is equal to one is not reported), and one amplitude coefficient $$a_{n,l,d,t}^{(3)}$$

is reported per precoder coefficient (possibly except for the strongest coefficient $$a_{n,l,d,t}^{(3)}$$

whose amplitude ana phase are equal to '1' and '0', respectively, is not reported). In this case (L−1) amplitude coefficients $$a_{n,l,d,t}^{(2)}$$

are reported. In some examples, $$a_{n,l}^{(2)}=a_{l}^{(2)},$$

and only L−1 values are reported to the UE for all transmission layers instead of L−1 values for each layer.

Amplitude Quantization Scheme 7—Common l, Specific t, Specific d:

In another embodiment, the amplitude coefficients $$a_{n,l,d,t}^{(2)}$$

are common for all indices l i.e., $$a^{(2)}_{n,l,d,t} = a^{(2)}_{n,d,t},$$

and one amplitude coefficient $$a^{(2)}_{n,l,d,t}$$

is reported per index d (d=0, . . . , D−1) and per index t (t∈{1,2}) (except for the strongest coefficient $$a^{(2)}_{n,l,d,t}$$

whose amplitude is equal to one is not reported), and one amplitude coefficient $$a^{(3)}_{n,l,d,t}$$

is reported per precoder coefficient (possibly except for the strongest coefficient $$a^{(3)}_{n,l,d,t}$$

whose amplitude and phase are equal to '1' and '0', respectively, is not reported). In this case, either (TD−1) or T(D−1) amplitude coefficients $$a^{(2)}_{n,l,d,t}$$

are reported.

In some examples, $$a^{(2)}_{n,d,t} = a^{(2)}_{d,t},$$

and only (TD−1) or T(D−1) values are reported to the UE for all transmission layers instead of (TD−1) or T(D−1) values for each layer.

Amplitude Quantization Scheme 8—Common l, Common t, Specific d:

In another embodiment, the amplitude coefficients $$a^{(2)}_{n,l,d,t}$$

are common for all indices l and indices t i.e., $$a^{(2)}_{n,l,d,t} = a^{(2)}_{n,d},$$

and one amplitude coefficient $$a^{(2)}_{n,l,d,t}$$

is reported per index d (d=0, . . . , D−1) (except for the strongest coefficient $$a^{(2)}_{n,l,d,t}$$

whose amplitude is equal to one is not reported), and one amplitude coefficient $$a^{(3)}_{n,l,d,t}$$

is reported per precoder coefficient (possibly except for the strongest coefficient $$a^{(3)}_{n,l,d,t}$$

whose amplitude and phase are equal to '1' and '0', respectively, is not reported). In this case, either (D−1) amplitude coefficients $$a^{(2)}_{n,l,d,t}$$

are reported.

In some examples, $$a^{(2)}_{n,d} = a^{(2)}_{d},$$

and only D−1 values are reported to the UE for all transmission layers instead of D−1 values for each layer.

Amplitude Quantization Scheme 9—Common l, Specific t, Common d:

In an embodiment, the first amplitude coefficients $$a^{(1)}_{n,l,d,t}$$

are common for all (l, d). In this case, $$a^{(1)}_{n,l,d,t} = 1$$

is fixed and not reported (i.e., they are not present). In one embodiment, the amplitude coefficients $$a^{(2)}_{n,l,d,t}$$

are common for all (l, d) per index t (i.e., per polarization) i.e., $$a^{(2)}_{n,l,d,t} = a^{(2)}_{n,t}$$

and one amplitude coefficient is reported per layer. In this case, $$a^{(2)}_{n,l,d,t} = 1$$

is fixed for t=1 or t=2, and hence not reported for one polarization, and $$a^{(2)}_{n,l,d,t}$$

for t=2 or t=1 is reported for the other polarization. An amplitude coefficient $$a^{(3)}_{n,l,d,t}$$

is reported per precoder coefficient (possibly except for the strongest coefficient $$a^{(3)}_{n,l,d,t}$$

whose amplitude and phase are equal to '1' and '0', respectively, is not reported). In this case only one amplitude coefficient $$a^{(2)}_{n,l,d,t}$$

is reported.

In some examples, $$a^{(2)}_{n,t} = a^{(2)}_{t},$$

and only one amplitude coefficient is reported to the UE for all transmission layers instead of one amplitude coefficient value for each layer.

Amplitude Quantization Scheme 10—Specific l, Specific t, Specific d:

In an embodiment, the first amplitude coefficients $$a^{(1)}_{n,l,d,t}$$

are common for all d i.e., $$a^{(1)}_{n,l,d,t} = a^{(1)}_{n,l,t},$$

and one amplitude coefficient is reported per index l and per index t (except for the strongest coefficient $$a^{(1)}_{n,l,d,t}$$

whose amplitude is equal to one is not reported). The second amplitude coefficients $$a^{(2)}_{n,l,d,t}$$

are common for all l and t i.e., $$a^{(2)}_{n,l,d,t} = a^{(2)}_{n,d}$$

and one amplitude coefficient is reported per index d (except for the strongest coefficient $$a^{(2)}_{n,l,d,t}$$

whose amplitude is equal to one is not reported). An amplitude coefficient $$a^{(3)}_{n,l,d,t}$$

is reported per precoder coefficient (possibly except for the strongest coefficient $$a^{(3)}_{n,l,d,t}$$

whose amplitude and phase are equal to '1' and '0', respectively, is not reported). In this case, a total of (2L−1) amplitude coefficients $$a^{(1)}_{n,l,d,t}$$

and (D−1) amplitude coefficients $$a^{(2)}_{n,l,d,t}$$

are reported.

In some examples, $$a^{(1)}_{n,l,t} = a^{(1)}_{l,t}, \text{ and } a^{(2)}_{n,d} = a^{(2)}_{d}$$

and a total of (2L−1)+(D−1) amplitude coefficients are reported to the UE for all transmission layers instead of (2L−1)+(D−1) values for each layer.

Amplitude Quantization Scheme 11—Specific l, Common t, Specific d:

In an embodiment, the first amplitude coefficients $$a_{n,l,d,t}^{(2)}$$

are common for all d and t i.e., $$a_{n,l,d,t}^{(1)} = a_{n,l}^{(1)},$$

and one amplitude coefficient is reported per index l (except for the strongest coefficient $$a_{n,l,d,t}^{(1)}$$

whose amplitude is equal to one is not reported). The second amplitude coefficients $$a_{n,l,d,t}^{(2)}$$

are common for all l and t i.e., $$a_{n,l,d,t}^{(2)} = a_{n,d}^{(2)}$$

and one amplitude coefficient is reported per index d (except for the strongest coefficient $$a_{n,l,d,t}^{(2)}$$

whose amplitude is equal to one is not reported). An amplitude coefficient $$a_{n,l,d,t}^{(3)}$$

is reported per precoder coefficient (possibly except for the strongest coefficient $$a_{n,l,d,t}^{(3)}$$

whose amplitude and phase are equal to '1' and '0', respectively, is not reported). In this case, a total of (L−1) amplitude coefficients $$a_{n,l,d,t}^{(1)}$$

and (D−1) amplitude coefficients $$a_{n,l,d,t}^{(2)}$$

are reported.

In some examples, $$a_{n,l}^{(1)} = a_l^{(1)}, \text{ and } a_{n,d}^{(2)} = a_d^{(2)}$$

and a total of (L−1)+(D−1) amplitude coefficients are reported to the UE for all transmission layers instead of (L−1)+(D−1) values for each layer.

Amplitude Quantization Scheme 12—Common l, Specific t, Specific d:

In an embodiment, the first amplitude coefficients $$a_{n,l,d,t}^{(1)}$$

are common for all t and d i.e., $$a_{n,l,d,t}^{(1)} = a_{n,t}^{(1)},$$

and one amplitude coefficient is reported per index t (except for the strongest coefficient $$a_{n,l,d,t}^{(1)}$$

whose amplitude is equal to one is not reported). The second amplitude coefficients $$a_{n,l,d,t}^{(2)}$$

are common for all l and t i.e., $$a_{n,l,d,t}^{(2)} = a_{n,d}^{(2)}$$

and one amplitude coefficient is reported per index d (except for the strongest coefficient $$a_{n,l,d,t}^{(2)}$$

whose amplitude is equal to one is not reported). An amplitude coefficient $$a_{n,l,d,t}^{(3)}$$

is reported per precoder coefficient (possibly except for the strongest coefficient $$a_{n,l,d,t}^{(3)}$$

whose amplitude and phase are equal to '1' and '0', respectively, is not reported). In this case, a total of one amplitude coefficient $$a_{n,l,d,t}^{(1)}$$

and (D−1) amplitude coefficients $$a_{n,l,d,t}^{(2)}$$

are reported.

In some examples, $$a_{n,t'}^{(1)}=a_t^{(1)}, \text{ and } a_{n,d}^{(2)}=a_d^{(2)}$$

and a total of 1+(D−1) amplitude coefficients are reported to the UE for all transmission layers instead of 1+(D−1) values for each layer.

Normalization and Quantization of Precoder Coefficients Jointly Across all Layers:

Hereafter the term 'subset of layers' may either mean a fraction of transmission layers or all transmission layers reported by the UE.

In one embodiment, the UE may be configured to quantize the selected complex precoder coefficients $\{p_{n,l,d}\}$ (or $\{p_{n,l,d,t}\}$ ($t\in\{1,2\}$)) for a subset of transmission layers jointly and report them.

In accordance to embodiments, the UE is configured to normalize the complex precoder coefficients of a subset of layers jointly such that the maximum amplitude and phase of a strongest coefficient among all coefficients associated with the subset of layers is given by '1' and '0', respectively and is not reported.

In accordance with embodiments, for quantization scheme 2, when the normalization is performed jointly for a subset of layers, the amplitude coefficients for each layer are given by $$a_{n,l}^{(2)}=a_l^{(2)}$$

and only L−1 values are reported to the UE for the subset of layers instead of L−1 values for each layer.

In accordance with embodiments, for quantization scheme 3, when the normalization is performed jointly for a subset of layers, the amplitude coefficients for each layer associated with the subset of layers are given by $$a_{n,d}^{(2)}=a_d^{(2)},$$

and only D−1 values are reported to the UE for the subset of layers instead of D−1 values for each layer.

In accordance with embodiments, for quantization scheme 5, when the normalization is performed jointly for a subset of layers, the amplitude coefficients for each layer associated with the subset of layers are given by $$a_{n,l,t}^{(2)}=a_{l,t}^{(2)},$$

and only 2L−1 values are reported to the UE for the subset of layers instead of 2L−1 values for each layer.

In accordance with embodiments, for quantization scheme 6, when the normalization is performed jointly for a subset of layers, the amplitude coefficients for each layer associated with the subset of layers are given by $$a_{n,l}^{(2)}=a_l^{(2)},$$

and only L−1 values are reported to the UE for the subset of layers instead of L−1 values for each layer.

In accordance with embodiments, for quantization scheme 7, when the normalization is performed jointly for a subset of layers, the amplitude coefficients for each layer associated with the subset of layers are given by $$a_{n,d,t}^{(2)}=a_{d,t}^{(2)},$$

and only (TD−1) or T(D−1) values are reported to the UE for the subset of layers instead of (TD−1) or T(D−1) values for each layer.

In accordance with embodiments, for quantization scheme 8, when the normalization is performed jointly for a subset of layers, the amplitude coefficients for each layer associated with the subset of layers are given by $$a_{n,d}^{(2)}=a_d^{(2)},$$

and only D−1 values are reported to the UE for the subset of layers instead of D−1 values for each layer.

In accordance with embodiments, for quantization scheme 9, when the normalization is performed jointly for a subset of layers, the amplitude coefficients for each layer associated with the subset of layers are given by $$a_{n,t}^{(2)}=a_t^{(2)},$$

and only one amplitude coefficient is reported to the UE for are reported to the UE for the subset of layers instead of one amplitude coefficient value for each layer.

In accordance with embodiments, for quantization scheme 10, when the normalization is performed jointly for a subset of layers, the amplitude coefficients for each layer associated with the subset of layers are given by $$a_{n,l,t}^{(1)}=a_{l,t}^{(1)}, \text{ and } a_{n,d}^{(2)}=a_d^{(2)}$$

and a total of (2L−1)+(D−1) amplitude coefficients are reported to the UE for the subset of layers instead of (2L−1)+(D−1) values for each layer.

In accordance with embodiments, for quantization scheme 11, when the normalization is performed jointly for a subset of layers, the amplitude coefficients for each layer associated with the subset of layers are given by $$a_{n,l'}^{(1)}=a_l^{(1)}, \text{ and } a_{n,d}^{(2)}=a_d^{(2)}$$

and a total of (L−1)+(D−1) amplitude coefficients are reported to the UE for the subset of layers instead of (L−1)+(D−1) values for each layer.

In accordance with embodiments, for quantization scheme 12, when the normalization is performed jointly for a subset of layers, the amplitude coefficients for each layer associated with the subset of layers are given by $$a_{n,t}^{(1)}, = a_t^{(1)}, \text{ and } a_{n,d}^{(2)} = a_d^{(2)}$$

and a total of 1+(D−1) amplitude coefficients are reported to the UE for the subset of layers instead of 1+(D−1) values for each layer.

GENERAL

The term subset used herein is used to define a set whose elements are all members of another set. The term subset may also refer herein to a proper subset whose elements are all members of another set, and wherein the set has one or more elements that do not belong to the subset.

In accordance with embodiments, the wireless communication system may include a terrestrial network, or a non-terrestrial network, or networks or segments of networks using as a receiver an airborne vehicle or a spaceborne vehicle, or a combination thereof. In accordance with embodiments, the UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator. In accordance with embodiments, the base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

The embodiments of the present invention have been described above with reference to a communication system in which the transmitter is a base station serving a user equipment, and the communication device or receiver is the user equipment served by the base station. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources. Thus, the present invention is not limited to precoding between a UE and a base station, but is equally applicable to, e.g., sidelink-based precoding for UE to UE communications.

It is noted that the term 'higher layer' as used herein, when used in isolation, denotes any communication layer above the physical layer in the protocol stack. It is further noted that the term matrix as used herein refers to a matrix including one or more columns, and in the former case the matrix may also be referred to as a vector.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 12:
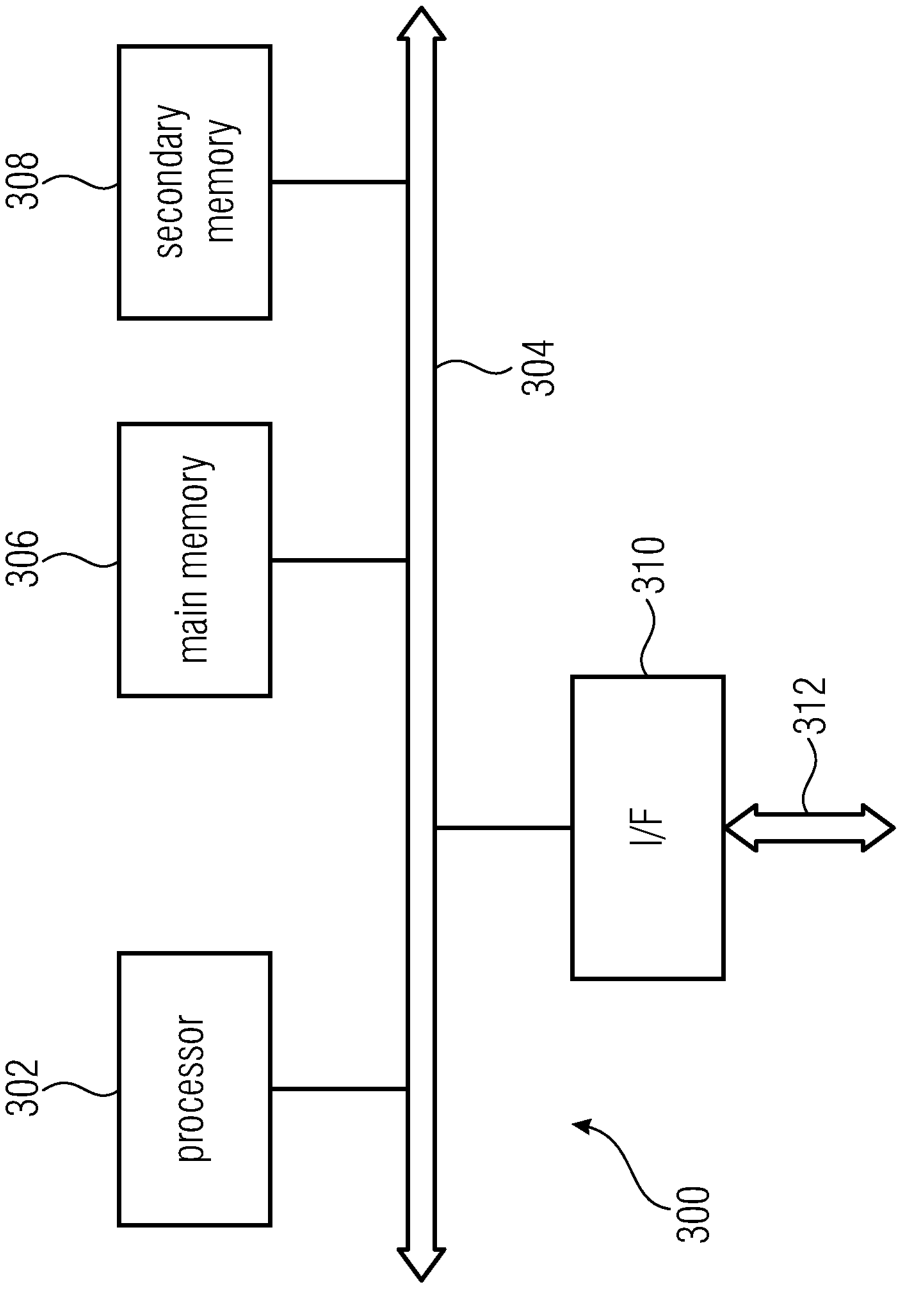
FIG. 12 illustrates a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates a computer system 300. The units or modules as well as the steps of the methods performed by these units may execute on one or more computer systems 300. The computer system 300 includes one or more processors 302, like a special purpose or a general purpose digital signal processor. The processor 302 is connected to a communication infrastructure 304, like a bus or a network. The computer system 300 includes a main memory 306, e.g., a random access memory (RAM), and a secondary memory 308, e.g., a hard disk drive and/or a removable storage drive. The secondary memory 308 may allow computer programs or other instructions to be loaded into the computer system 300. The computer system 300 may further include a communications interface 310 to allow software and data to be transferred between computer system 300 and external devices. The communication may be in the from electronic, electromagnetic, optical, or other signals capable of being handled by a communications interface. The communication may use a wire or a cable, fiber optics, a phone line, a cellular phone link, an RF link and other communications channels 312.

The terms "computer program medium" and "computer readable medium" are used to generally refer to tangible storage media such as removable storage units or a hard disk installed in a hard disk drive. These computer program products are means for providing software to the computer system 300. The computer programs, also referred to as computer control logic, are stored in main memory 306 and/or secondary memory 308. Computer programs may also be received via the communications interface 310. The computer program, when executed, enables the computer system 300 to implement the present invention. In particular, the computer program, when executed, enables processor 302 to implement the processes of the present invention, such as any of the methods described herein. Accordingly, such a computer program may represent a controller of the computer system 300. Where the disclosure is implemented using software, the software may be stored in a computer program product and loaded into computer system 300 using a removable storage drive, an interface, like communications interface 310.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

REFERENCES

[1] 3GPP TS 38.214 V15.8.0: "3GPP; TSG RAN; NR; Physical layer procedures for data (Rel. 15).", January 2020.

[2] Samsung "Revised WID: Enhancements on MIMO for NR", RP-182067, 3GPP RAN #81, Gold Coast, Australia, Sep. 10-13, 2018.

[3] R1-1806124, Fraunhofer I I S, Fraunhofer H H I, Enhancements on Type-II CSI reporting scheme, RAN1 #93, Busan, South Korea, May 21-May 25, 2018.

[4] R1-1811088, Fraunhofer I I S, Fraunhofer H H I, Enhancements on Type-II CSI reporting scheme, RAN1 #94-Bis, Chengdu, China, Oct. 8-Oct. 12, 2018.

[5] 3GPP TS 38.214 V16.0.0: "3GPP; TSG RAN; NR; Physical layer procedures for data (Rel. 16).", January 2020.

[6] T. Choi, F. Rottenberg, J. Gomez-Ponce, A. Ramesh, P. Luo, J. Zhang, and A. F. Molisch, "Channel extrapolation for FDD massive MIMO: Procedure and experimental results," IEEE 90th Vehicular Technology Conference (VTC2019-Fall), 2019.

[7] W. Peng, W. Li, W. Wang, X. Wei, and T. Jiang, "Downlink channel prediction for time-varying FDD massive MIMO systems," IEEE Journal of Selected Topics in Signal Processing, vol. 13, no. 5, pp. 1090-1102, September 2019.

[8] K. Hugl, K. Kalliola, and J. Laurila, "Spatial reciprocity of uplink and downlink radio channels in FDD systems," COST 273 TD(02) 066, May 2002.

[9] Z. Zong, Li Fan, S. Ge, "FDD Massive MIMO Uplink and Downlink Channel Reciprocity Properties: Full or Partial Reciprocity?," https://arxiv.org/pdf/1912.11221.pdf, December 2019.

[10] 3GPP TS 38.211 V16.0.0: "3GPP; TSG RAN; NR; Physical channels and modulation (Rel. 16).", January 2020.

The invention claimed is:

1. A method comprising:

receiving a radio signal from a transmitter via a Multiple Input Multiple Output channel, wherein the radio signal comprises at least one reference signal wherein the at least one reference signal is configured according to at least one reference signal configuration, wherein the at least one reference signal configuration is known at a receiver, wherein the at least one reference signal configuration indicates at least one antenna port at the receiver, wherein the at least one antenna port is associated with the at least one reference signal;

estimating the Multiple Input Multiple Output channel based on measurements on the at least one reference signal received over the at least one antenna port;

determining a precoding vector or matrix, wherein the precoding vector or matrix is determined based on the estimated Multiple Input Multiple Output channel, on at least one vectors or at least one combinations of vectors selected from at least one port-selection codebook and on a plurality of precoding coefficients, wherein the port-selection codebook comprises a plurality of vectors, wherein each vector of the plurality of vectors is associated with one of the at least one antenna ports, wherein each vector of the plurality of vectors has a first element and remaining elements, wherein the first element is one and the remaining elements are zeros; and reporting a feedback to the transmitter, wherein the feedback indicates the precoding vector or matrix determined by the receiver.

2. The method of claim 1, further comprising using at least one subbands of a transmission bandwidth for the receiving via the Multiple Input Multiple Output channel, wherein the precoding vector or matrix is identical for the at least one subbands.

3. The method of claim 1, wherein the precoding vector or matrix for each transmission layer is defined for N3 subbands or Physical Resource Blocks or frequency domain components used for Precoding Matrix Indicator reporting, wherein the precoding vector or matrix for each transmission layer is based on at least one vector or at least one combination of vectors selected from the port-selection codebook and a delay codebook and a plurality of precoding coefficients, wherein the delay codebook comprises D vectors, wherein each vector from the port-selection codebook is associated with one of the at least one antenna port, wherein each vector from the delay codebook is associated with a delay or delay index of the precoder, wherein each vector from the delay codebook is represented by a Discrete Fourier Transform-based vector for the N3 subbands of the precoder vector or matrix, wherein the delay codebook comprises D Discrete Fourier Transform-based vectors for the $N_3$ subbands, wherein each vector is of size N3×1 and associated with a delay index, wherein D<N3 and the delay codebook comprises the first D Discrete Fourier Transform-based vectors (a0, . . . , aD−1), or wherein the D vectors of the delay codebook are associated with the indices ai, ∀i=0, . . . , D−1 from the delay codebook comprises N3 Discrete Fourier Transform-based vectors, wherein ai=mod(as+i, N3), ∀i=0, . . . , D−1, wherein as is the starting index of the vector from the delay codebook, wherein the delay codebook comprises the D vectors (a mod(as+0,N3), . . . a mod(as+D−1,N3)).

4. The method of claim 3, wherein the parameter D represents the number of Discrete Fourier Transform-based vectors of the delay codebook configured to the UE from the network node, or fixed by a specification and known by the receiver.

5. The method of claim 3, wherein the precoding vector for a transmission layer is based on L vectors selected from the port-selection codebook and a portion of vectors selected from the delay codebook, wherein the portion is equal or less than D.

6. The method of claim 1, wherein the feedback indicates the precoding coefficients determined by the receiver, wherein the receiver is arranged to decompose each precoder coefficient in at least one amplitude coefficient and a phase coefficient.

7. The method of claim 6, wherein the feedback comprises a quantized value of the first amplitude coefficient, a quantized value of the second amplitude coefficient and a quantized value of the phase coefficient for each determined precoder coefficient.

8. The method of claim 7, wherein an amplitude coefficient reported if the precoder coefficient or the amplitude coefficient is non-zero.

9. The method of claim 6, wherein the feedback comprises a quantized value of a first amplitude coefficient, a quantized value of a second amplitude coefficient, a quantized value of a third amplitude coefficient and a quantized value of the phase coefficient for each determined precoder coefficient, wherein the first amplitude is not reported, wherein the second amplitude coefficients are common for all ports l, wherein the second first amplitude coefficient is reported for each delay index d (d=O, . . . , D−1), wherein the third amplitude coefficient is reported for each precoder coefficient, the second amplitude coefficients are common for all delays d, and the second amplitude coefficient is reported per port index l (l=0, . . . , L−1) and the third amplitude coefficient is reported per precoder coefficient.

10. The method of claim 1, wherein the feedback indicates precoding coefficients determined by the receiver, wherein the indicated precoding coefficients are not equal to zero.

11. The method of claim 1, wherein the feedback is selected from the group consisting of a Channel State Information, CSI, feedback, Precoder Matrix Indicator, and a Precoder Matrix Indicator/Rank Indicator.

12. The method of claim 1, wherein each of the at least one antenna port in the at least one reference signal configuration is precoded or beamformed, wherein each of the at least one antenna port in the at least one reference signal configuration is associated with a spatial beam and a delay.

13. The method of claim 1, further comprising:

acquiring uplink channel sounding measurements so as to acquire angular or spatial information and delay information, and utilizing the acquired angular or spatial information and delay information for precoding or beamforming a plurality of at least one reference signal resources used for the channel measurements and feedback calculations at the receiver.

14. A computer program stored on a non-transitory medium, wherein the computer program when executed on a processor performs the method as claimed in claim 1.

15. The method of claim 1, wherein the receiver is to indicate L ports by a $$\left\lceil \log_2 \binom{P/2}{L} \right\rceil$$

combinatorial bit-indicator, with L denoting a number of ports over two polarizations of P of the at least one antenna port.

16. The method of claim 6, wherein the feedback comprises a quantized value of a first amplitude coefficient, a quantized value of a second amplitude coefficient, a quantized value of a third amplitude coefficient and a quantized value of the phase coefficient for each determined precoder coefficient, wherein the first amplitude is not reported, wherein the second amplitude coefficients are common for all delays d (d=O, . . . , D−1), wherein the second amplitude coefficient is reported for each port index l (l=0, . . . , L−1), wherein the third amplitude coefficient is reported for each precoder coefficient.

17. A receiver comprising:

a receiver circuit, wherein the receiver circuit is arranged to receive a radio signal via a Multiple Input Multiple Output channel, wherein the radio signal comprises at least one reference signal wherein the at least one reference signal is configured according to at least one reference signal configuration, wherein the at least one reference signal configuration is known at a receiver, wherein the at least one reference signal configuration indicates at least one antenna port at the receiver, wherein the at least one reference signal configuration indicates at least one associated with the at least one reference signal; and a processor circuit and a memory circuit, wherein the memory is arranged to store instructions for the processor circuit, wherein the processor circuit is arranged to estimate the Multiple Input Multiple Output channel based on measurements on the at least one reference signal received over the at least one antenna port, wherein the processor circuit is arranged to determine a precoding vector or matrix so as to achieve a predefined property for a communication over the Multiple Input Multiple Output channel, wherein the precoding vector or matrix is determined based on the estimated Multiple Input Multiple Output channel using at least one port-selection codebook and a plurality of precoding coefficients, wherein the port-selection codebook comprises a plurality of vectors wherein each vector of the plurality of vectors is associated with one of the at least one antenna port, wherein each vector of the plurality of vectors has a first element and remaining elements, wherein the first element is one and the remaining elements are zeros; and wherein the processor circuit is arranged to report a feedback to a transmitter, wherein the feedback indicates the precoding vector or matrix determined by the receiver.

18. The receiver of claim 17, wherein the processor circuit is arranged to use at least one subbands of a transmission bandwidth for the receiving via the Multiple Input Multiple Output channel, wherein the precoding vector or matrix is identical for the at least one subbands.

19. The receiver of claim 17, wherein the precoding vector or matrix for each transmission layer is defined for N3 subbands or Physical Resource Blocks or frequency domain components used for Precoding Matrix Indicator reporting, wherein the precoding vector or matrix for each transmission layer is based on at least one vector or at least one combination of vectors selected from the port-selection codebook and a delay codebook and a plurality of precoding coefficients, wherein the delay codebook comprises D vectors, wherein each vector from the port-selection codebook is associated with one of the at least one antenna ports, wherein each vector from the delay codebook is associated with a delay or delay index of the precoder, wherein each vector from the delay codebook is represented by a Discrete Fourier Transform-based vector for the N3 subbands of the precoder vector or matrix, wherein the delay codebook comprises D Discrete Fourier Transform-based vectors for the N3 subbands, wherein each vector is of size N3×1 and associated with a delay index, wherein D<N3 and the delay codebook comprises the first D Discrete Fourier Transform-based vectors (a0, . . . , aD−1), or wherein the D vectors of the delay codebook are associated with the indices ai, ∀i=0, . . . , D−1 from the delay codebook comprises N3 Discrete Fourier Transform-based vectors, wherein ai=mod(as+i, N3), ∀i=0, . . . , D−1, wherein as is the starting index of the vector from the delay codebook, wherein the delay codebook comprises the D vectors (a mod(as+0,N3), . . . a mod(as+D−1,N3)).

20. The receiver of claim 19, wherein the parameter D represents the number of Discrete Fourier Transform-based vectors of the delay codebook configured to the UE from the network node, or fixed by a specification and known by the receiver.

21. The receiver of claim 19, wherein the precoding vector for a transmission layer is based on L vectors selected from the port-selection codebook and a portion of vectors selected from the delay codebook, wherein the portion is equal or less than D.

22. The receiver of claim 17, wherein the feedback indicates the precoding coefficients determined by the receiver, wherein the receiver is arranged to decompose each precoder coefficient in at least one amplitude coefficient and a phase coefficient.

23. The receiver of claim 22, wherein the feedback comprises a quantized value of the first amplitude coefficient, a quantized value of the second amplitude coefficient and a quantized value of the phase coefficient for each determined precoder coefficient.

24. The receiver of claim 23, wherein an amplitude coefficient reported if the precoder coefficient or the amplitude coefficient is non-zero.

25. The receiver of claim 22, wherein the feedback comprises a quantized value of a first amplitude coefficient, a quantized value of a second amplitude coefficient, a quantized value of a third amplitude coefficient and a quantized value of the phase coefficient for each determined precoder coefficient, wherein the first amplitude is not reported, wherein the second amplitude coefficients are common for all ports l, wherein the second first amplitude coefficient is reported for each delay index d (d=O, . . . , D−1), wherein the third amplitude coefficient is reported for each precoder coefficient.

26. The receiver of claim 22, wherein the feedback comprises a quantized value of a first amplitude coefficient, a quantized value of a second amplitude coefficient, a quantized value of a third amplitude coefficient and a quantized value of the phase coefficient for each determined precoder coefficient, the first amplitude is not reported, wherein the second amplitude coefficients are common for all delays d (d=O, . . . , D−1), wherein the second amplitude coefficient is reported for each port index l (l=0, . . . , L−1), wherein the third amplitude coefficient is reported for each precoder coefficient.

27. The receiver of claim 17, wherein the feedback indicates precoding coefficients determined by the processor circuit, wherein the indicated precoding coefficients are not equal to zero.

28. The receiver of claim 17, wherein the feedback is selected from the group consisting of a Channel State Information, CSI, feedback, Precoder Matrix Indicator, and a Precoder Matrix Indicator/Rank Indicator.

29. The receiver of claim 17, wherein each of the at least one antenna port in the at least one reference signal configuration is precoded or beamformed, wherein each of the at least one antenna port in the at least one reference signal configuration is associated with a spatial beam and a delay.

30. The receiver of claim 17, wherein the processor circuit is arranged to acquire uplink channel sounding measurements so as to acquire angular or spatial information and delay information, and wherein the processor circuit is arranged to utilize the acquired angular or spatial information and delay information for precoding or beamforming a plurality of at least one reference signal resources used for the channel measurements and feedback calculations at the receiver.

31. The receiver of claim 17, wherein the processor circuit is arranged to indicate L ports by a $$\left\lceil \log_2 \binom{P/2}{L} \right\rceil$$

combinatorial bit-indicator, with L denoting a number of ports over two polarizations of P of the at least one antenna ports.

* * * * *